United States Patent
Heichal et al.

(10) Patent No.: US 8,517,132 B2
(45) Date of Patent: **\*Aug. 27, 2013**

(54) ELECTRIC VEHICLE BATTERY SYSTEM

(75) Inventors: Yoav Heichal, Ganey Yehuda (IL); Tal Agassi, Hod Hasaron (IL)

(73) Assignee: Better Place GmbH, Zug (CH)

( \* ) Notice: Subject to any disclaimer, the term of this patent is extended or adjusted under 35 U.S.C. 154(b) by 0 days.

This patent is subject to a terminal disclaimer.

(21) Appl. No.: 13/209,348

(22) Filed: Aug. 12, 2011

(65) Prior Publication Data

US 2011/0297470 A1 Dec. 8, 2011

Related U.S. Application Data

(63) Continuation of application No. 12/428,932, filed on Apr. 23, 2009, now Pat. No. 8,006,793.

(60) Provisional application No. 61/098,724, filed on Sep. 19, 2008, provisional application No. 61/149,690, filed on Feb. 3, 2009, provisional application No. 61/206,913, filed on Feb. 4, 2009, provisional application No. 61/166,239, filed on Apr. 2, 2009.

(51) Int. Cl.
   *B60K 1/04* (2006.01)
(52) U.S. Cl.
   USPC .......................................... 180/68.5
(58) Field of Classification Search
   USPC .................. 180/68.5; 429/100; 104/34
   See application file for complete search history.

(56) References Cited

U.S. PATENT DOCUMENTS

| | | | |
|---|---|---|---|
| 3,197,830 A | 8/1965 | Hoadley | |
| 3,681,805 A | 8/1972 | Shelstad et al. | |
| 3,690,397 A | 9/1972 | Parker | |
| 3,719,151 A | 3/1973 | Andersen | |
| 3,799,063 A | 3/1974 | Reed | |
| D235,555 S | 6/1975 | Plummer | D26/5 R |
| D237,718 S | 11/1975 | Bozich | D26/12 |
| 4,052,655 A | 10/1977 | Vizza | |
| 4,087,895 A | 5/1978 | Etienne | |

(Continued)

FOREIGN PATENT DOCUMENTS

| | | |
|---|---|---|
| CN | 101702425 A | 5/2010 |
| DE | 3439038 A1 | 10/1984 |

(Continued)

OTHER PUBLICATIONS

International Search Report and Written Opinion, PCT/US2009/057594, Dec. 16, 2009, 10 pages.

(Continued)

*Primary Examiner* — Katy M Ebner
(74) *Attorney, Agent, or Firm* — Greenberg Traurig, LLP

(57) ABSTRACT

The electric vehicle includes a battery pack that can be exchanged at a battery exchange station. At the battery exchange station, an at least partially spent battery pack is exchanged for an at least partially charged battery pack. A battery bay is configured to be disposed at an underside of the electric vehicle. The battery bay includes a frame which defines a cavity. The cavity is configured to at least partially receive the battery pack therein. The battery bay comprises at least one latch rotatably pivoted about an axis substantially parallel with a plane formed by the underside of the vehicle. The latch is configured to lift, retain the battery pack at least partially within the cavity.

22 Claims, 24 Drawing Sheets

(56) References Cited

U.S. PATENT DOCUMENTS

| | | | |
|---|---|---|---|
| 4,102,273 A | 7/1978 | Merkle et al. | |
| 4,217,628 A | 8/1980 | Windom | |
| 4,309,644 A | 1/1982 | Reimers et al. | 318/139 |
| 4,338,587 A | 7/1982 | Chiappetti | 340/32 |
| 4,345,147 A | 8/1982 | Aaron et al. | |
| 4,347,472 A | 8/1982 | Lemelson | |
| 4,352,992 A | 10/1982 | Buennagel et al. | 307/40 |
| 4,365,681 A * | 12/1982 | Singh | 180/68.5 |
| 4,383,210 A | 5/1983 | Wilkinson | |
| 4,404,641 A | 9/1983 | Bazarnik | 364/569 |
| D270,831 S | 10/1983 | Jensen | D13/40 |
| D274,126 S | 6/1984 | Flies | D8/347 |
| 4,532,418 A | 7/1985 | Meese et al. | |
| 4,532,511 A | 7/1985 | Lemelson | 340/933 |
| D286,040 S | 10/1986 | LaValle | D13/24 |
| D286,854 S | 11/1986 | Fane et al. | D8/347 |
| 4,709,202 A | 11/1987 | Koenck et al. | 320/43 |
| 4,789,047 A | 12/1988 | Knobloch | |
| 4,791,871 A | 12/1988 | Mowll | 104/94 |
| 4,800,328 A | 1/1989 | Bolger et al. | 320/2 |
| D299,821 S | 2/1989 | Dively | D13/31 |
| 4,846,697 A | 7/1989 | Rodgers | 439/35 |
| 4,861,971 A | 8/1989 | Chan | 235/384 |
| 4,876,513 A | 10/1989 | Brilmyer et al. | 324/427 |
| 4,876,540 A | 10/1989 | Berthon et al. | 340/932.2 |
| 4,880,097 A | 11/1989 | Speas | 194/239 |
| D307,580 S | 5/1990 | Reali | D13/133 |
| D308,267 S | 5/1990 | Bradd | D32/31 |
| 4,960,150 A | 10/1990 | Ryan | |
| 4,967,895 A | 11/1990 | Speas | 194/200 |
| D314,182 S | 1/1991 | Moerman | D13/152 |
| 5,003,476 A | 3/1991 | Abe | 364/424.03 |
| 5,003,520 A | 3/1991 | Grieu et al. | 368/90 |
| 5,049,802 A | 9/1991 | Mintus et al. | 320/2 |
| 5,058,044 A | 10/1991 | Stewart et al. | 364/551.01 |
| 5,072,380 A | 12/1991 | Randelman et al. | 364/406 |
| 5,091,856 A | 2/1992 | Hasegawa et al. | 364/424.05 |
| 5,151,865 A | 9/1992 | Blessing et al. | 364/483 |
| 5,157,319 A | 10/1992 | Klontz et al. | |
| 5,159,272 A | 10/1992 | Rao et al. | 324/429 |
| 5,184,058 A | 2/1993 | Hesse et al. | 320/4 |
| 5,189,836 A | 3/1993 | Alder et al. | |
| 5,202,617 A | 4/1993 | Nor | |
| 5,206,578 A | 4/1993 | Nor | 320/14 |
| 5,229,704 A | 7/1993 | Knepper | 320/2 |
| 5,230,637 A | 7/1993 | Weber | |
| 5,263,565 A | 11/1993 | Wilkinson | |
| 5,297,664 A | 3/1994 | Tseng et al. | |
| 5,306,999 A | 4/1994 | Hoffman | |
| 5,315,227 A | 5/1994 | Pierson et al. | |
| D349,099 S | 7/1994 | Robertson, Jr. et al. | D13/147 |
| 5,327,066 A | 7/1994 | Smith | |
| 5,349,535 A | 9/1994 | Gupta | |
| 5,350,312 A | 9/1994 | Kuno et al. | |
| 5,369,352 A | 11/1994 | Toepfer et al. | 320/56 |
| 5,453,585 A | 9/1995 | Lenz et al. | 191/12.2 R |
| 5,461,299 A | 10/1995 | Bruni | |
| 5,462,439 A | 10/1995 | Keith | 439/34 |
| 5,478,250 A | 12/1995 | Hoffman | |
| 5,504,991 A | 4/1996 | Parmley, Sr. | |
| 5,535,274 A | 7/1996 | Braitberg et al. | 379/446 |
| 5,539,399 A | 7/1996 | Takahira et al. | 340/995 |
| D373,192 S | 8/1996 | Murphy et al. | D24/129 |
| 5,542,488 A | 8/1996 | Nixon | |
| 5,545,046 A | 8/1996 | Masuda et al. | |
| 5,563,491 A | 10/1996 | Tseng | |
| 5,568,390 A | 10/1996 | Hirota et al. | 364/449 |
| 5,573,090 A | 11/1996 | Ross | 191/10 |
| 5,585,205 A | 12/1996 | Kohchi | |
| 5,590,749 A | 1/1997 | Wagner et al. | 191/12.4 |
| 5,605,150 A | 2/1997 | Radons et al. | |
| 5,612,606 A | 3/1997 | Guimarin et al. | |
| 5,614,808 A | 3/1997 | Konoya et al. | 320/48 |
| 5,627,448 A | 5/1997 | Okada et al. | |
| 5,627,752 A | 5/1997 | Buck et al. | 364/424.04 |
| 5,631,536 A | 5/1997 | Tseng | |
| 5,644,209 A | 7/1997 | Chabbert et al. | 320/15 |
| 5,656,916 A | 8/1997 | Hotta | 320/22 |
| 5,696,367 A | 12/1997 | Keith | |
| 5,701,706 A | 12/1997 | Kreysler et al. | |
| 5,703,461 A | 12/1997 | Minoshima et al. | 320/2 |
| 5,711,648 A | 1/1998 | Hammerslag | |
| 5,742,229 A | 4/1998 | Smith | 340/438 |
| 5,758,414 A | 6/1998 | Ehrenfels | |
| 5,771,575 A | 6/1998 | Onizuka et al. | |
| 5,815,824 A | 9/1998 | Saga et al. | 701/22 |
| 5,821,731 A | 10/1998 | Kuki et al. | 320/108 |
| 5,822,427 A | 10/1998 | Braitberg et al. | 379/454 |
| 5,903,064 A | 5/1999 | Norberg | |
| 5,906,500 A | 5/1999 | Kakuta et al. | 439/310 |
| 5,913,917 A | 6/1999 | Murphy | 701/123 |
| 5,927,938 A | 7/1999 | Hammerslag | |
| 5,951,229 A | 9/1999 | Hammerslag | |
| D415,111 S | 10/1999 | Lee | D13/154 |
| 5,971,801 A | 10/1999 | Kato et al. | |
| 5,979,605 A | 11/1999 | Popp | |
| 5,992,946 A | 11/1999 | Bayer et al. | |
| 5,998,963 A | 12/1999 | Aarseth | |
| 6,002,396 A | 12/1999 | Davies | 345/339 |
| 6,014,597 A | 1/2000 | Kochanneck | |
| D420,644 S | 2/2000 | Nemser et al. | D13/146 |
| 6,050,835 A | 4/2000 | Henrion et al. | |
| 6,088,963 A | 7/2000 | Cawthon et al. | |
| 6,094,028 A | 7/2000 | Gu et al. | 320/109 |
| D429,622 S | 8/2000 | Bickle | D8/347 |
| 6,114,632 A | 9/2000 | Planas, Sr. et al. | |
| 6,123,569 A | 9/2000 | Fukushima et al. | 439/456 |
| D434,001 S | 11/2000 | Sayger | D13/139.5 |
| 6,177,879 B1 | 1/2001 | Kokubu et al. | 340/825.33 |
| 6,196,858 B1 | 3/2001 | Matsumoto et al. | |
| 6,204,505 B1 | 3/2001 | Call | 250/370.01 |
| 6,208,249 B1 | 3/2001 | Saito et al. | |
| 6,240,684 B1 | 6/2001 | Bigelow | |
| 6,358,075 B1 | 3/2002 | Tischner | |
| 6,371,768 B1 | 4/2002 | Neblett et al. | |
| 6,388,564 B1 | 5/2002 | Piercy et al. | 340/310.01 |
| 6,487,477 B1 | 11/2002 | Woestman et al. | 701/22 |
| 6,539,678 B1 | 4/2003 | Campbell et al. | |
| 6,632,560 B1 * | 10/2003 | Zhou et al. | 429/99 |
| 6,727,809 B1 | 4/2004 | Smith | |
| 6,834,907 B2 * | 12/2004 | Dietl | 296/121 |
| 6,909,287 B2 | 6/2005 | Bertness | 324/427 |
| 6,927,974 B2 | 8/2005 | Robillard et al. | |
| D515,033 S | 2/2006 | Petrick et al. | D13/139.4 |
| 7,003,411 B2 | 2/2006 | Bertness | 702/63 |
| D517,591 S | 3/2006 | Kokido | D17/9 |
| 7,029,040 B2 | 4/2006 | Lippoldt et al. | |
| D522,963 S | 6/2006 | Hayes et al. | D13/108 |
| 7,090,521 B2 | 8/2006 | Nishio et al. | |
| 7,158,008 B2 | 1/2007 | Waring et al. | 340/5.66 |
| 7,201,384 B2 | 4/2007 | Chaney | 280/68.5 |
| 7,256,516 B2 | 8/2007 | Buchanan et al. | 307/62 |
| 7,270,045 B1 | 9/2007 | Gonzalez | |
| D559,785 S | 1/2008 | Tosetti | D13/147 |
| 7,400,113 B2 | 7/2008 | Osborne | 320/118 |
| 7,411,371 B2 | 8/2008 | Hobbs | 320/128 |
| 7,444,192 B2 | 10/2008 | Dickinson et al. | 700/83 |
| 7,602,143 B2 | 10/2009 | Capizzo | 320/109 |
| D607,831 S | 1/2010 | Andre et al. | D13/154 |
| 7,826,941 B2 | 11/2010 | Hayashi et al. | 701/22 |
| 7,993,155 B2 | 8/2011 | Heichal et al. | |
| 8,006,793 B2 | 8/2011 | Heichal et al. | |
| 8,013,571 B2 | 9/2011 | Agassi et al. | |
| 2001/0002789 A1 | 6/2001 | Terazoe | 320/108 |
| 2002/0026252 A1 | 2/2002 | Wruck et al. | 700/90 |
| 2003/0209375 A1 | 11/2003 | Suzuki et al. | |
| 2004/0044452 A1 | 3/2004 | Bauer et al. | 701/33 |
| 2004/0164706 A1 | 8/2004 | Osborne | 320/116 |
| 2005/0032404 A1 | 2/2005 | Furuta et al. | |
| 2005/0138432 A1 | 6/2005 | Ransom et al. | 713/201 |
| 2005/0162172 A1 | 7/2005 | Bertness | 324/426 |
| 2006/0028171 A1 | 2/2006 | Marraffa | 320/107 |
| 2006/0149459 A1 | 7/2006 | Matsuura et al. | 701/201 |
| 2006/0185756 A1 | 8/2006 | Sato et al. | 141/94 |

| Publication No. | Date | Inventor | Class |
|---|---|---|---|
| 2006/0229806 A1 | 10/2006 | Forlenza et al. | 701/207 |
| 2006/0277882 A1 | 12/2006 | Berger et al. | 56/10.2 J |
| 2007/0113921 A1* | 5/2007 | Capizzo | 141/231 |
| 2007/0241721 A1 | 10/2007 | Weinstein et al. | 320/114 |
| 2008/0027639 A1 | 1/2008 | Tryon | |
| 2008/0052145 A1 | 2/2008 | Kaplan et al. | |
| 2008/0203973 A1 | 8/2008 | Gale et al. | |
| 2008/0220958 A1 | 9/2008 | Hayasaka et al. | |
| 2008/0258682 A1 | 10/2008 | Li | 320/109 |
| 2008/0315837 A1 | 12/2008 | Elder et al. | 320/134 |
| 2009/0011639 A1 | 1/2009 | Ballard et al. | |
| 2009/0014224 A1* | 1/2009 | Rydberg et al. | 180/68.5 |
| 2009/0021358 A1 | 1/2009 | Lee et al. | |
| 2009/0024232 A1 | 1/2009 | Dickinson et al. | 700/89 |
| 2009/0030712 A1 | 1/2009 | Bogolea et al. | |
| 2009/0043519 A1 | 2/2009 | Bridges et al. | |
| 2009/0043520 A1 | 2/2009 | Pollack et al. | |
| 2009/0058355 A1 | 3/2009 | Meyer | |
| 2009/0082957 A1 | 3/2009 | Agassi et al. | |
| 2009/0091291 A1 | 4/2009 | Woody et al. | |
| 2009/0174365 A1 | 7/2009 | Lowenthal et al. | |
| 2009/0184689 A1 | 7/2009 | Kressner et al. | |
| 2009/0216387 A1 | 8/2009 | Klein | |
| 2009/0312903 A1 | 12/2009 | Hafner et al. | |
| 2009/0313032 A1 | 12/2009 | Hafner et al. | |
| 2009/0313033 A1 | 12/2009 | Hafner et al. | |
| 2009/0313034 A1 | 12/2009 | Ferro et al. | |
| 2009/0313098 A1 | 12/2009 | Hafner et al. | |
| 2009/0313103 A1 | 12/2009 | Ambrosio et al. | |
| 2009/0313104 A1 | 12/2009 | Hafner et al. | |
| 2009/0327165 A1 | 12/2009 | Kaufman | |
| 2010/0019718 A1 | 1/2010 | Salasoo et al. | |
| 2010/0019726 A1 | 1/2010 | Kumar | |
| 2010/0039067 A1 | 2/2010 | Hill et al. | |
| 2010/0049533 A1 | 2/2010 | Ferro et al. | |
| 2010/0049610 A1 | 2/2010 | Ambrosio et al. | |
| 2010/0065627 A1 | 3/2010 | Outwater | |
| 2010/0071979 A1 | 3/2010 | Heichal et al. | |
| 2010/0082464 A1 | 4/2010 | Keefe | |
| 2010/0112843 A1 | 5/2010 | Heichal et al. | |
| 2010/0114798 A1 | 5/2010 | Sirton | |
| 2010/0134067 A1 | 6/2010 | Baxter et al. | |
| 2010/0145717 A1 | 6/2010 | Hoeltzel | 705/1.1 |
| 2010/0145837 A1 | 6/2010 | Graziano et al. | |
| 2010/0161469 A1 | 6/2010 | Littrell | |
| 2010/0161483 A1 | 6/2010 | Littrell | |
| 2010/0237985 A1 | 9/2010 | Landau-Holdsworth et al. | |
| 2010/0280702 A1 | 11/2010 | Artus | 701/30 |
| 2010/0286938 A1 | 11/2010 | Kaneko | 702/63 |
| 2011/0050164 A1 | 3/2011 | Partovi et al. | |
| 2011/0066515 A1 | 3/2011 | Horvath et al. | |

FOREIGN PATENT DOCUMENTS

| | | |
|---|---|---|
| DE | 4120060 A1 | 12/1992 |
| DE | 10338279 A1 | 3/2005 |
| EP | 0047089 A1 | 3/1982 |
| EP | 0233638 A2 | 8/1987 |
| EP | 0476405 A1 | 3/1992 |
| EP | 0548748 A1 | 6/1993 |
| EP | 0551080 A2 | 7/1993 |
| EP | 0575864 A2 | 12/1993 |
| EP | 0599528 A2 | 6/1994 |
| EP | 0644625 A2 | 3/1995 |
| EP | 0692849 A1 | 1/1996 |
| EP | 0769218 A1 | 4/1997 |
| EP | 1170609 A2 | 1/2002 |
| EP | 1275936 A2 | 1/2003 |
| FR | 2685547 A1 | 6/1993 |
| FR | 2696139 A1 | 4/1994 |
| FR | 2721559 A1 | 12/1995 |
| FR | 2737694 A1 | 2/1997 |
| FR | 2934927 A1 | 2/2010 |
| FR | 2940638 A3 | 7/2010 |
| FR | 2943970 A3 | 10/2010 |
| GB | 1377729 A | 12/1974 |
| GB | 2219151 A | 11/1989 |
| GB | 2253379 A | 9/1992 |
| JP | 05122802 A | 5/1993 |
| JP | 2001-291530 | 10/2001 |
| JP | 2004-215468 | 7/2004 |
| JP | 2004-331020 | 11/2004 |
| JP | 2004331020 A * | 11/2004 |
| JP | 2006-113892 | 4/2006 |
| JP | 2005-238969 | 9/2006 |
| JP | 2006-331405 | 12/2006 |
| JP | 2008-056400 | 3/2008 |
| JP | 2011-208287 | 10/2011 |
| WO | WO 93/02887 A1 | 2/1993 |
| WO | WO 93/08629 A1 | 4/1993 |
| WO | WO 93/08630 A1 | 4/1993 |
| WO | WO 94/09544 A1 | 4/1994 |
| WO | WO 94/11853 A1 | 5/1994 |
| WO | WO 94/26002 A1 | 11/1994 |
| WO | WO 94/28526 A1 | 12/1994 |
| WO | WO 96/01520 A1 | 1/1996 |
| WO | WO 98/21132 A1 | 5/1998 |
| WO | WO 2008/073453 A1 | 6/2008 |
| WO | WO 2008/073470 A2 | 6/2008 |
| WO | WO 2008/073472 A2 | 6/2008 |
| WO | WO 2008/073474 A2 | 6/2008 |
| WO | WO 2008/073476 A2 | 6/2008 |
| WO | WO 2008/073477 A2 | 6/2008 |
| WO | WO 2009/068783 A2 | 6/2009 |
| WO | WO 2009/109826 A1 | 9/2009 |
| WO | WO 2009/156780 A1 | 12/2009 |
| WO | WO 2010/004192 A2 | 1/2010 |
| WO | WO 2010/015777 A1 | 2/2010 |
| WO | WO 2010/040931 A2 | 4/2010 |
| WO | WO 2010/076457 A1 | 7/2010 |
| WO | WO 2010/094892 A1 | 8/2010 |
| WO | WO 2010/094898 A1 | 8/2010 |
| WO | WO 2010/122266 A1 | 10/2010 |
| WO | WO 2010/122267 A2 | 10/2010 |
| WO | WO 2010/124831 A2 | 11/2010 |
| WO | WO 2010/150665 A1 | 12/2010 |
| WO | WO 2011/012601 A2 | 2/2011 |
| WO | WO 2011/058253 A1 | 5/2011 |
| WO | WO 2011/058256 A1 | 5/2011 |
| WO | WO 2011/128765 A2 | 10/2011 |

OTHER PUBLICATIONS

International Search Report and Written Opinion, PCT/US2009/057596, Dec. 30, 2009, 10 pages.

Office Action, Australian Patent Application 2008302073, Jul. 21, 2011, 1 pg.

Office Action, Japanese Patent Application 2010-526033, Jun. 16, 2011, 4 pgs.

International Preliminary Examination Report for PCT/US08/77132 dated Feb. 22, 2010, 5 pgs.

International Search Report for PCT/US2010/048661 dated Dec. 10, 2010, 3 pgs.

Better Place GmbH, European Search Report, EP Application 11189231.1, Dec. 23, 2011, 2 pgs.

* cited by examiner

Latch grips the striker on the battery pack and pulls it up

Bell crank is in geometric lock

ELECTRIC VEHICLE BATTERY SYSTEM

RELATED APPLICATIONS

This application is a continuation which claims the benefit of U.S. application Ser. No. 12/428,932, filed Apr. 23, 2009 now U.S. Pat. No. 8,006,793, which claims the benefit of U.S. Provisional Patent Application No. 61/098,724, filed Sep. 19, 2008, and U.S. Provisional Patent Application No. 61/149,690, filed Feb. 3, 2009, and U.S. Provisional Patent Application No. 61/206,913, filed Feb. 4, 2009, and U.S. Provisional Patent Application No. 61/166,239, filed Apr. 2, 2009, each of which is incorporated by reference herein in its entirety.

TECHNICAL FIELD

The disclosed embodiments relate generally to electric vehicles with removable battery packs. In particular, the disclosed embodiments relate to an electric vehicle battery pack and battery bay, and related mechanisms for insertion, removal, and locking of the battery pack in the battery bay of the electric vehicle.

BACKGROUND

The vehicle (e.g., cars, trucks, planes, boats, motorcycles, autonomous vehicles, robots, forklift trucks etc.) is an integral part of the modern economy. Unfortunately, fossil fuels, like oil which is typically used to power such vehicles, have numerous drawbacks including: a dependence on limited foreign sources of fossil fuels; these foreign sources are often in volatile geographic locations; and such fuels produce pollution and climate change. One way to address these problems is to increase the fuel economy of these vehicles. Recently, gasoline-electric hybrid vehicles have been introduced, which consume substantially less fuel than their traditional internal combustion counterparts, i.e., they have better fuel economy. However, gasoline-electric hybrid vehicles do not eliminate the need for fossil fuels, as they still require an internal combustion engine in addition to the electric motor.

Another way to address this problem is to use renewable resource fuels such as bio-fuels. Bio-fuels, however, are currently expensive and years away from widespread commercial use.

Yet another way to address these problems is to use clean technologies, such as electric motors powered by fuel cells or batteries. However, many of these clean technologies are not yet practical. For example, fuel cell vehicles are still under development and are expensive. Batteries are costly and may add as much as 40% to the cost of a vehicle. Similarly, rechargeable battery technology has not advanced to the point where mass-produced and cost effective batteries can power electric vehicles for long distances. Present battery technology does not provide an energy density comparable to gasoline. Therefore, even on a typical fully charged electric vehicle battery, the electric vehicle may only be able to travel about 40 miles before needing to be recharged, i.e., for a given vehicle storage, the electric vehicles travel range is limited. Furthermore, batteries can take many hours to recharge. For example, batteries may need to be recharged overnight. As the charging time of a typical electric vehicle battery can last numerous hours and recharging may not be an option on a long journey, a viable "quick refuel" system and method for battery powered electric vehicles would be highly desirable.

SUMMARY

In order to overcome the above described drawbacks, a network of charge spots and battery exchange stations are deployed to provide the EV (electric vehicle) user with the ability to keep his or her vehicle charged and available for use at all times. Some embodiments provide a system and method to quickly exchange, a spent depleted (or substantially discharged) battery pack for a fully charged (or substantially fully charged) battery pack at a battery exchange station. The quick exchange is performed in a period of time significantly less than that required to recharge a battery. Thus, the long battery recharge time may no longer be relevant to a user of an electric vehicle who is traveling beyond the range of the battery.

Furthermore, the cost of the electric vehicle can be substantially reduced because the battery of the electric vehicle can be separated from the initial cost of the vehicle. For example, the battery can be owned by a party other than the user of the vehicle, such as a financial institution or a service provider. These concepts are explained in more detail in U.S. patent application Ser. No. 12/234,591, filed Sep. 19, 2008, entitled Electronic Vehicle Network, incorporated herein by reference. Thus, the batteries may be treated as components of the electric recharge grid (ERG) infrastructure to be monetized over a long period of time, and not a part of the vehicle purchased by the consumer.

The following provides a detailed description of a system and method for swapping-out or replacing battery packs in electric vehicles. Some embodiments provide a description of the quick exchangeable battery packs attached to the vehicle.

Some embodiments provide a battery bay configured to be disposed at an underside of an at least partially electric vehicle. The battery bay includes a frame that defines a cavity configured to at least partially receive a battery pack therein. In some embodiments, the frame of the battery bay forms part of the structure of the vehicle body and is not a separate component. The battery bay also includes at least one latch mechanism rotatably pivoted about an axis substantially parallel with a plane formed by an underside of the vehicle (and/or the surface on which the vehicle is configured to travel, e.g., the road). The latch mechanism is configured to retain the battery pack at least partially within the cavity. In some embodiments, an additional latch is rotatably pivoted about an additional axis substantially parallel to and distinct from the first axis. In some embodiments, the axis and the additional axis are substantially perpendicular to a length of the vehicle.

In some embodiments, a transmission assembly is mechanically coupled to the latch and the additional latch, the transmission assembly is configured to simultaneously rotate the latch and the additional latch in rotational directions opposite to one another. In some embodiments, an electric motor is mechanically coupled to the frame for driving the transmission assembly. In some embodiments, the transmission assembly is configured to be driven by a rotation mechanism external to the vehicle.

Some embodiments provide a method of removing a battery pack from an underside of an at least partially electric vehicle. The method includes rotating a latch mechanism mechanically coupled to a vehicle so as to disengage contact between the latch and a battery pack disposed at an underside of at least partially electric vehicle. The battery pack is then translated away from the underside of the vehicle. In some embodiments, the method of removal involves, prior to the rotating, mechanically disengaging a first lock mechanism. In some embodiments, the method of removal involves, prior to the rotating, electronically disengaging a second lock mechanism. In some embodiments, the method of removal involves occurs in less than one minute.

Some embodiments provide another method of coupling a battery pack to an electric vehicle. The method of coupling includes substantially simultaneously engaging a first latch located at a front end of the underside of the electric vehicle with a first striker located at a front end of a battery pack and a second latch located at a back end of the underside of the electric vehicle with a second striker located at a back end of a battery pack. Then, the battery pack is substantially simultaneously locked into the electric vehicle by rotating the first and second latches into their respective physical lock positions. In some embodiments, the method of coupling further comprises substantially simultaneously vertically lifting the battery pack into the electric vehicle by rotating the first and second latches in opposite directions, which engages with and raises the battery pack.

Some embodiments provide a battery system that includes a battery bay for receiving a battery pack. The battery bay is located at an underside of the electric vehicle. The battery bay includes a first latch configured to mechanically couple a front end of the battery pack to a front end of the underside of the electric vehicle, and a second latch configured to mechanically couple a back end of the battery pack to a back end of the underside of the electric vehicle. The first latch and the second latch mechanically couple the battery pack to the underside of the electric vehicle by engaging, vertically lifting, and locking the front and back ends of the battery pack to the electric vehicle substantially simultaneously.

Some embodiments provide a battery system that includes a battery pack configured to be mechanically coupled to an underside of an electric vehicle, a first latch configured to mechanically couple a proximate end of the battery pack to a proximate end of the underside of the electric vehicle, and a second latch configured to mechanically couple a distal end of the battery pack to a distal end of the underside of the electric vehicle. The first latch and the second latch mechanically couple the battery pack to the underside of the electric vehicle substantially simultaneously.

In some embodiments, the battery bay includes a latch that is attached to the frame at a first side of the cavity. The battery bay also includes at least one additional latch attached to the frame at a second side of the cavity opposite the first side of the cavity. The additional latch is rotatably pivoted about another axis substantially parallel with the plane formed by the underside of the vehicle. The additional latch is configured to retain the battery pack at least partially within the cavity.

In some embodiments, the battery bay's latch has a proximate end which rotates about the axis and a distal end remote from the proximate end that is configured to engage a bar shaped striker on the battery pack. In some embodiments, the distal end of the latch has a hook shape.

In some embodiments, the frame is formed integrally with a frame of the vehicle. In some embodiments, the frame is a separate unit configured to attach to the at least partially electric vehicle. In some embodiments, the frame is located between a front axle and a rear axle of the partially electric vehicle. In some embodiments, the frame defines a substantially rectangular shaped opening, having two long sides and two short sides. In some embodiments, the frame defines an opening having five, six, or more sides defining any shape configured to receive a corresponding battery pack. In some embodiments, the long sides extend along axes substantially parallel (or near parallel) with an axis extending from the front to the back of the vehicle. In some embodiments, the frame defines a substantially cuboid shaped cavity for at least partially receiving the battery pack therein.

In some embodiments, the battery bay has one or more vibration dampers that are disposed between the frame and the at least partially electric vehicle.

In some embodiments, the latch and the additional latch substantially simultaneously rotate in opposite directions about their respective axes. In some embodiments, the battery pack is engaged and locked into the at least partially electric vehicle when the latches substantially simultaneously rotate towards one another. In some embodiments, the battery pack is disengaged and unlocked from the at least partially electric vehicle when the latches substantially simultaneously rotate away from one another.

In some embodiments, the latch and the additional latch are configured to mechanically decouple the battery pack from the underside of the at least partially electric vehicle substantially simultaneously.

In some embodiments, the latch (or latch mechanism) is part of a four bar linkage mechanism. In some embodiments, the four bar linkage mechanism includes: a latch housing, a input link including a first pivot point and a second pivot point, wherein the first pivot point is pivotably coupled to a proximate end of the latch housing; a latch including a third pivot point and a fourth pivot point; and a coupler link rod including a first rod end and a second rod end. The fourth pivot point is pivotably coupled to a distal end of the latch housing. The first rod end is pivotably coupled to the second pivot point of the input link. The second rod end is also pivotably coupled to the third pivot point of the latch.

In some embodiments, the coupler link rod includes an adjustment bolt configured to adjust a length of the coupler link rod. In some embodiments, when the input link is in a first position, the latch is configured to mechanically decouple from a striker of the battery pack. In some embodiments, when the input link is in a second position, the latch is in an engaged position configured to mechanically couple to a striker of the battery pack and the input link, the coupler link rod, and the hook are in a geometric lock configuration. In some embodiments, the latch is configured to raise the battery pack along an axis substantially perpendicular to the plane formed by the underside of the vehicle.

In some embodiments, the battery bay further comprises a battery pack, which comprises: at least one rechargeable battery cell that stores electrical energy, and a housing at least partially enclosing the at least one rechargeable battery cell. The housing further comprises at least one striker having a bar shape, that is configured to engage with the latch.

In some embodiments, the housing of the battery pack has a height substantially less than its length, wherein a portion of the housing includes a heat exchange mechanism that has at least a portion thereof exposed to ambient air at the underside of the vehicle when the battery pack is attached to the vehicle. In some embodiments, the battery pack, when attached to the vehicle, at least partially protrudes below the plane of the underside of the electric vehicle. In some embodiments, a portion of the housing includes a heat exchange mechanism that has at least a portion thereof exposed to ambient air at the underside of the vehicle, when the battery pack is attached to the vehicle. In some embodiments, the heat exchange mechanism is selected from at least one of: a heat sink; a heat exchanger; a cold plate; and a combination of the aforementioned mechanisms. In some embodiments, the heat exchange mechanism is a cooling mechanism that includes a duct running through the housing. In some embodiments, the cooling duct includes a plurality of fins. In some embodiments, the cooling duct includes a scooped inlet. In some embodiments, the scooped inlet contains a filter to prevent debris from entering the cooling duct.

In some embodiments, the battery bay further includes a battery pack. The battery pack includes a housing configured to substantially fill a cavity in a battery bay of the vehicle. The housing includes: a first side wall; a second side wall opposing the first side wall; at least one first striker disposed at the first side wall having a bar shape wherein the central axis of the first striker is parallel to the first side wall; at least one second striker disposed at the second side wall having a bar shape wherein the central axis of the second striker is parallel to the second side wall; and at least one battery cell that stores electrical energy. The battery cell is at least partially enclosed within the housing. In some embodiments the bar shaped strikers have some anti-friction attachments such as roller bearings or low friction surface treatments.

In some embodiments, the frame of the battery bay further includes at least one alignment socket configured to mate with at least one alignment pin on the battery pack.

In some embodiments, the frame of the battery bay further includes at least one compression spring coupled to the battery bay, wherein the at least one compression spring is configured to generate a force between the battery bay and the battery pack when the battery pack is held at least partially within the cavity.

In some embodiments, the transmission assembly further includes: a plurality of latches mechanically coupled to a first torque bar. The first torque bar is configured to actuate the latches. Additional latches are mechanically coupled to a second torque bar. The second torque bar is configured to actuate the additional latches. Furthermore, the first torque bar and the second torque bar are configured to substantially simultaneously rotate in opposite directions. In some embodiments, the first torque bar is located at a side of the battery bay nearest to a front end of the vehicle. The second torque bar is located at a side of the battery bay nearest to a back end of the vehicle.

In some embodiments, the transmission assembly further includes a first gear shaft coupled to a first torque bar via a first worm gear set, and a second gear shaft coupled to a second torque bar via a second worm gear set. The first gear shaft and the second gear shaft substantially simultaneously rotate in opposite directions causing the first torque bar and the second torque bar to substantially simultaneously rotate in opposite directions via the first worm gear set and second worm gear set. In some embodiments, the first gear shaft comprises two shafts joined by a universal joint. In some embodiments the design may include left and right worm gear set, a design which does not require the gear shafts to rotate in opposite directions.

In some embodiments, the transmission assembly further includes a miter gear set coupled to the first gear shaft and a second gear shaft. The miter gear set is configured to synchronously rotate the first and second gear shafts in opposite directions.

In some embodiments, the transmission assembly further includes a drive motor coupled to the miter gear set via a gear ratio set. The drive motor is configured to rotate the first and second gear shafts in opposite directions via the gear ratio set and the miter gear set.

In some embodiments, the transmission assembly further includes a drive socket located at an underside of the electric vehicle. The socket is coupled to the central gear of the miter gear set. Rotation of the socket actuates the miter gear set. In some embodiments, the drive socket has a non-standard shape for receiving a socket wrench having a head corresponding to the non-standard shape.

In some embodiments, the transmission assembly further includes a miter gear lock configured to prevent the miter gear set from rotating. In some embodiments, the miter gear lock is configured to be released with a key. In some embodiments, the key physically unlocks the miter gear lock. In some embodiments, miter gear lock is spring loaded.

In some embodiments, the battery bay further includes one or more latch locks, which when engaged, are configured to prevent the at least one latch from rotating. In some embodiments, the latch lock further includes a lock synchronization bar coupled to the one or more latch locks and a lock actuator coupled to the lock synchronization bar. The lock synchronization bar is configured to actuate the one or more latch locks. The lock actuator is configured to actuate the lock synchronization bar. In some embodiments, the one or more latch locks are lock bolts. In some embodiments, the lock actuator is coupled to an electric motor configured to actuate the lock synchronization bar via the lock actuator. In some embodiments, the lock synchronization bar is configured to rotate the one or more latch locks in a first direction so that the one or more latch locks become engaged, and wherein the lock synchronization bar is configured to rotate the one or more latch locks in a second direction so that the one or more latch locks become disengaged.

In some embodiments, the battery bay further comprises one or more latch locks, which when engaged, are configured to prevent the at least one latch from rotating. The one or more latch locks are configured to disengage only when the miter gear lock has been released.

In some embodiments, the battery bay further comprises a latch position indicator configured to determine an engaged position and a disengaged position of the latch.

BRIEF DESCRIPTION OF THE DRAWINGS

FIG. 2A is a bottom view of the electric vehicle and FIG. 2B is a side view of the electric vehicle.

Like reference numerals refer to corresponding parts throughout the drawings.

Description of Embodiments

Figure 1:
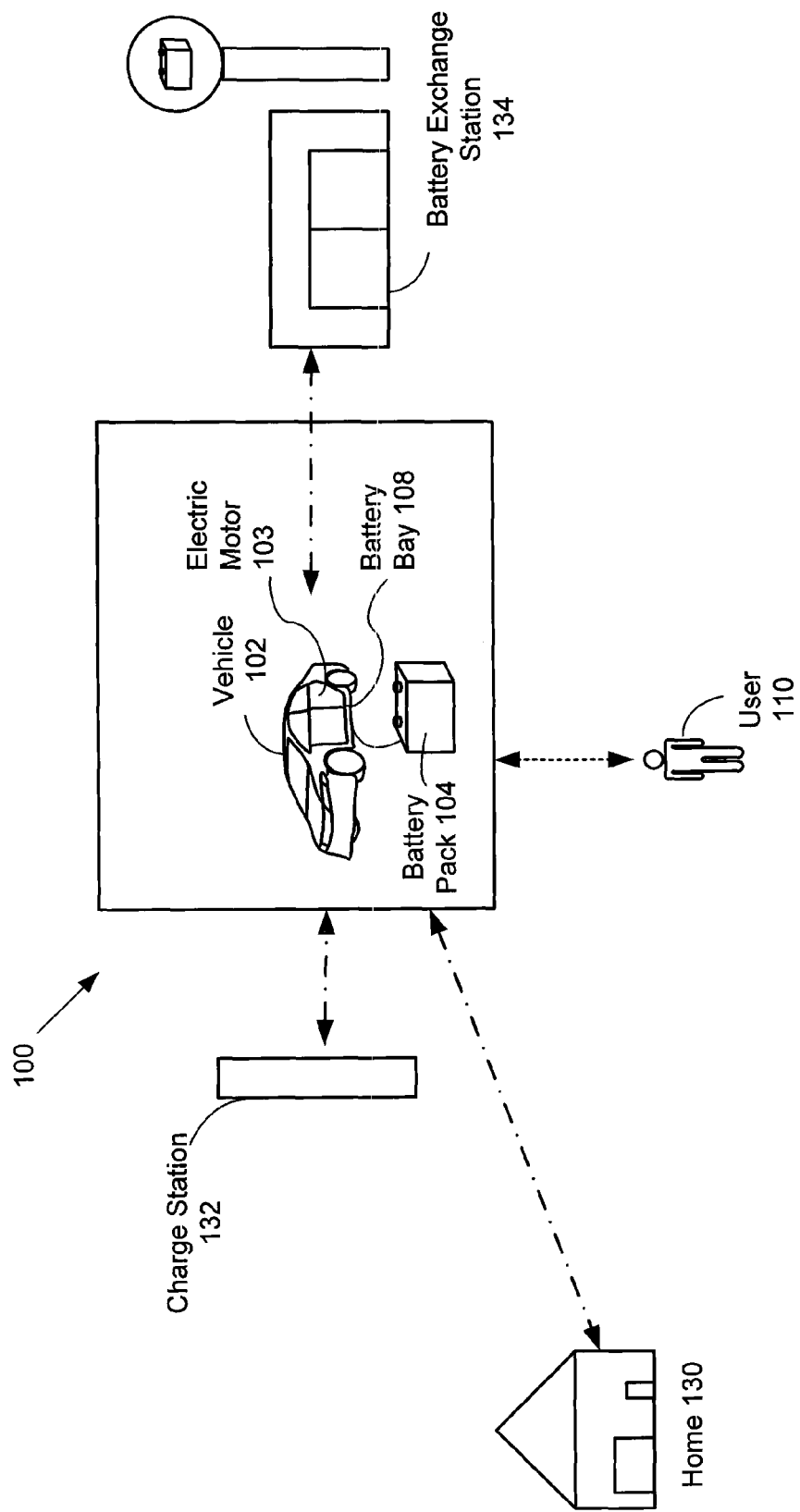
FIG. 1 illustrates an electric vehicle network.

FIG. 1 illustrates an electric vehicle network 100, according to some embodiments. The electric vehicle network 100 includes a vehicle 102 and a battery pack 104 configured to be removably mounted to the vehicle 102. In some embodiments, the battery pack 104 includes any device capable of storing electric energy such as batteries (e.g., lithium ion batteries, lead-acid batteries, nickel-metal hydride batteries, etc.), capacitors, reaction cells (e.g., Zn-air cell), etc. In some embodiments, the battery pack 104 comprises a plurality of individual batteries or battery cells/chemical modules. In some embodiments, the battery pack 104 also comprises cooling mechanisms, as well as mechanical and electrical connectors for connecting to the vehicle 102 or to the various elements of the battery exchange station 134. These mechanical and electrical connectors will be described in further detail below.

In some embodiments, the vehicle 102 includes an electric motor 103 that drives one or more wheels of the vehicle. In these embodiments, the electric motor 103 receives energy from the battery pack 104 (shown separate from the vehicle for the ease of explanation). The battery pack 104 of the vehicle 102 may be charged at a home 130 of a user 110 or at one or more charge stations 132. For example, a charge station 132 may be located in a shopping center parking lot. Furthermore, in some embodiments, the battery pack 104 of the vehicle 102 can be exchanged for a charged battery pack at one or more battery exchange stations 134. Thus, if a user is traveling a distance beyond the range of a single charge of the battery of the vehicle, the spent (or partially spent) battery can be exchanged for a charged battery so that the user can continue with his/her travels without waiting for the battery to be recharged. The battery exchange stations 134 are service stations where a user can exchange spent (or partially spent) battery packs 104 of the vehicle 102 for charged battery packs 104. The charge stations 132 provide energy to charge the battery pack 104 while it is coupled to the vehicle 102. These components of the network 100 are connected to related power and data networks, as explained in more detail in U.S. patent application Ser. No. 12/234,591, filed Sep. 19, 2008, entitled Electronic Vehicle Network, the disclosure of which is incorporated herein by reference.

Figure 2A:
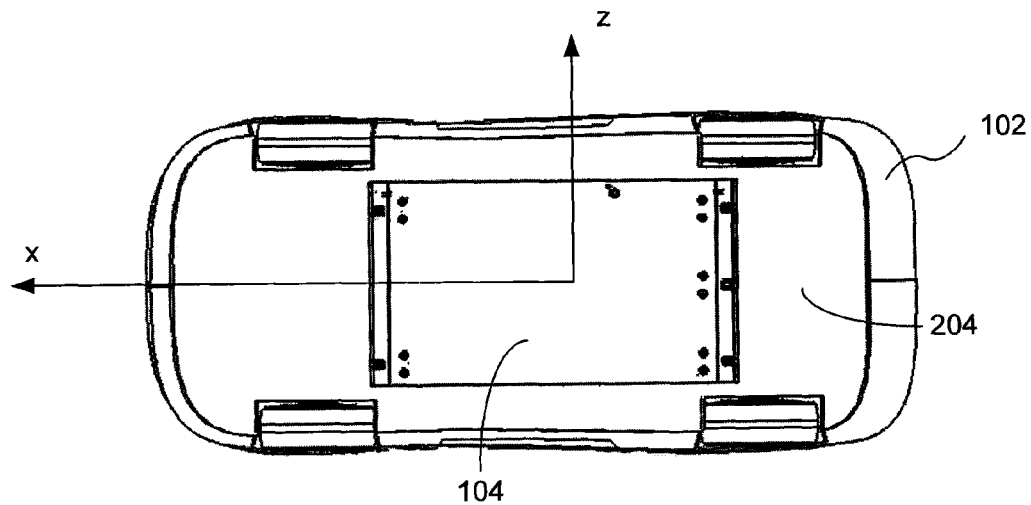
FIGS. 2A-2B are views of the electric vehicle of FIG. 1.
Figure 2B:
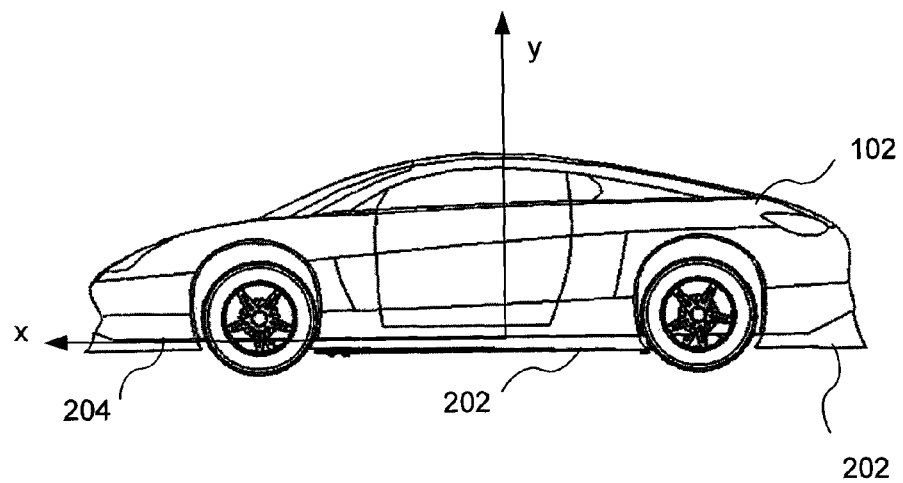

FIGS. 2A-2B are side and bottom views of an at least partially electric vehicle 102. The vehicle 102 includes a removable battery pack 104 (sometimes herein referred to just as a battery) attached to the vehicle 102 at its underside. In some embodiments, the battery pack 104 is substantially flat and runs along at least a portion of the length of the vehicle 102; i.e., along the longitudinal X-axis of the vehicle. In some embodiments, the battery 104 may protrude below the plane 204 of the underside of the vehicle 102, i.e., protruding in the negative Y-axis direction. Protruding from the underside of the vehicle is helpful for air cooling the battery pack 104, as the protruding battery pack is exposed to ambient air flow. In embodiments with air scoops, discussed below in relation to FIG. 6, at least the air scoop intake will be exposed to ambient air at the underside of the vehicle 102 to receive air flow when the vehicle 102 is moving forward. In some embodiments where the battery pack is retrofitted to a vehicle, i.e., after-market, the battery pack may protrude from the bottom of the vehicle.

When the battery 104, or portions thereof, protrude from below the plane of the underside 204 of the vehicle 102, it may, however, be unsightly. Therefore, in some embodiments, cosmetic fairings 202 are attached to the vehicle to hide the battery pack 104. In some embodiments, the cosmetic fairings 202 also produce a smooth outline and reduce drag. These cosmetic fairings 202 may be mounted on any or all of the front, sides, and rear of the vehicle.

Figure 3A:
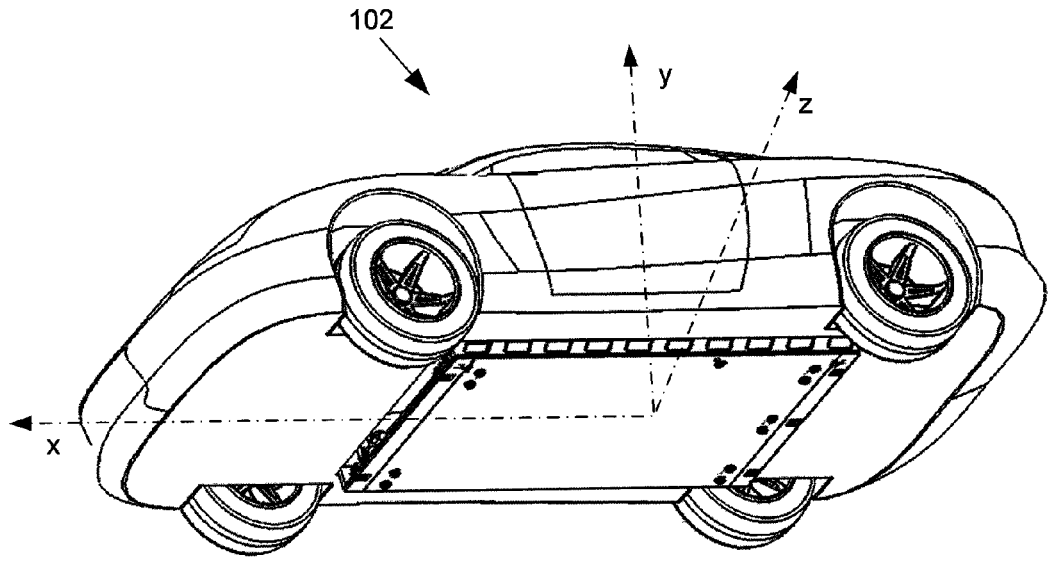
FIGS. 3A and 3B are underside perspective views of the electric vehicle and battery pack of FIG. 1.
Figure 3B:
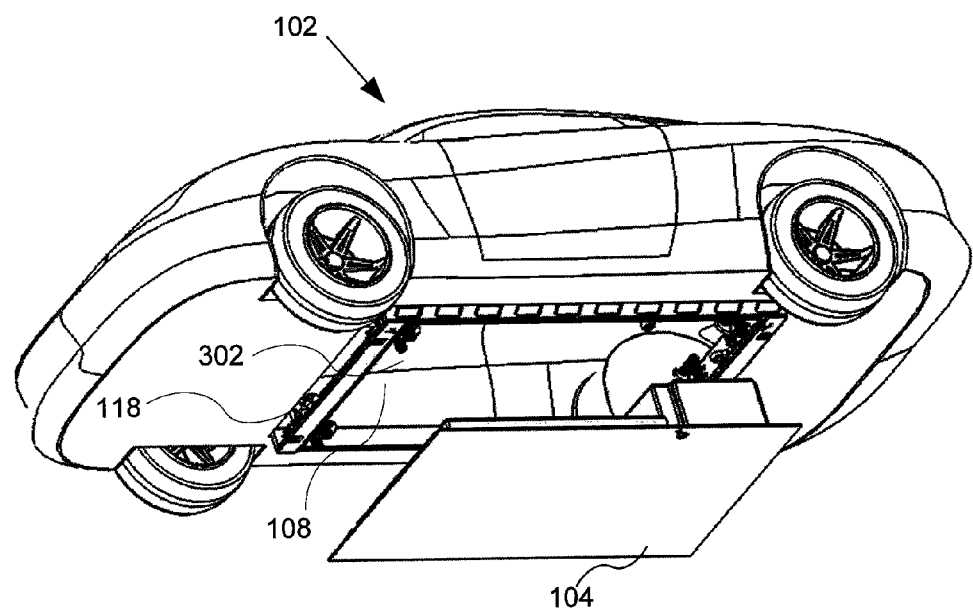

FIGS. 3A and 3B are underside perspective views of the electric vehicle 102 and battery pack 104 of FIG. 1. FIG. 3A shows the battery pack 104 mounted in a battery bay 108. FIG. 3B shows the battery pack 104 removed from the battery bay 108. The battery bay 108 includes a frame 118 that defines the outline of a cavity 302 disposed at the underside of the vehicle 102. The cavity 302 is configured to at least partially receive the battery pack 104 therein. In some embodiments, the bay frame 118 has a substantially rectangular shape, for at least partially receiving a substantially cuboid or rectangular parallelepiped battery pack 104 therein. In some embodiments, the frame 118 has two long sides along at least part of the length of the vehicle 102 (parallel to the X-axis) and two shorter sides along at least part of the width of the vehicle (parallel to the Z-axis) as shown. In some embodiments, the long sides of the frame 118 extend along axes substantially parallel with an axis extending from the front to the back of the vehicle 102 (parallel to the X-axis). In some embodiments, the battery bay 108 is located under the vehicle floor boards, between the rear and front axles of the vehicle 102.

In some embodiments, the cavity 302 into which the battery bay 108 is inserted uses existing volumes which are normally occupied by the fuel tank and muffler in a traditional gasoline or hybrid vehicle. In such a manner, the storage and/or passenger volume is not substantially impacted by the addition of the battery pack 104. In some embodiments, the vehicle body floor structure is shaped as a basin to accommodate the battery pack. The location of the battery bay 108 at or near the bottom of the vehicle lowers the vehicle's center of mass or gravity, when the battery pack 104 is coupled to the vehicle, which improves the cornering, road-holding, and performance of the vehicle. In some embodiments, the battery bay 108 is located within zones of the vehicle that are designed to not buckle during front or rear collisions to protect the battery pack 104.

In some embodiments, the battery bay 108 is a self-contained unit. In some embodiments, the battery bay structural connections to the vehicle frame (or unibody) are made through flexible vibration dampers (not shown). This allows the battery bay 108 to not interfere with the natural bending and torsion deflection of the vehicle frame. In some embodiments, the connections to the vehicle frame are made using removable fasteners such as bolts. In other embodiments the battery bay 104 is substantially permanently mounted to the vehicle by welding or other means.

The battery bay 108 is designed to withstand the load factors required by an original equipment manufacturer, national safety standards, or international safety standards. In some embodiments, the battery bay 108 is designed to withstand the following load factors:

Normal Operating Conditions: +/−1.5 $F_x$ and $F_z$, and +/−4 $F_y$, which may be substantially continuously oscillating at 1-100 Hz, where $F_x$, $F_y$, and $F_z$ are the forces in the X, Y, and Z directions respectively. In some embodiments, at this condition substantially no plastic deformation of the battery bay 108 will occur.

Exceptional Operating Conditions: +/−12 $F_x$ and $F_z$, and +/−8 $F_y$, which are not substantially continuously oscillating. In some embodiments, at these conditions substantially no plastic deformation of the battery bay 108 will occur.

Crash Conditions: +/−30 in $F_x$ and $F_z$, and +/−20 F.

In some embodiments, during Normal and Exceptional Operating Conditions, the battery pack 104 does not substantially rock, rattle, or otherwise move.

In some embodiments, the mechanical connection between the battery bay 108 and the vehicle frame is provided during the assembly of the vehicle 102. In other words, the battery bay 108 is a separate unit configured to attach to the at least partially electric vehicle 102. In some embodiments, the separate unit style battery bay 108 is retrofitted to a hybrid or internal combustion engine vehicle either before or after market. In other embodiments, the design of the battery bay 108 is formed integrally with a frame of the vehicle 102.

Figure 4:
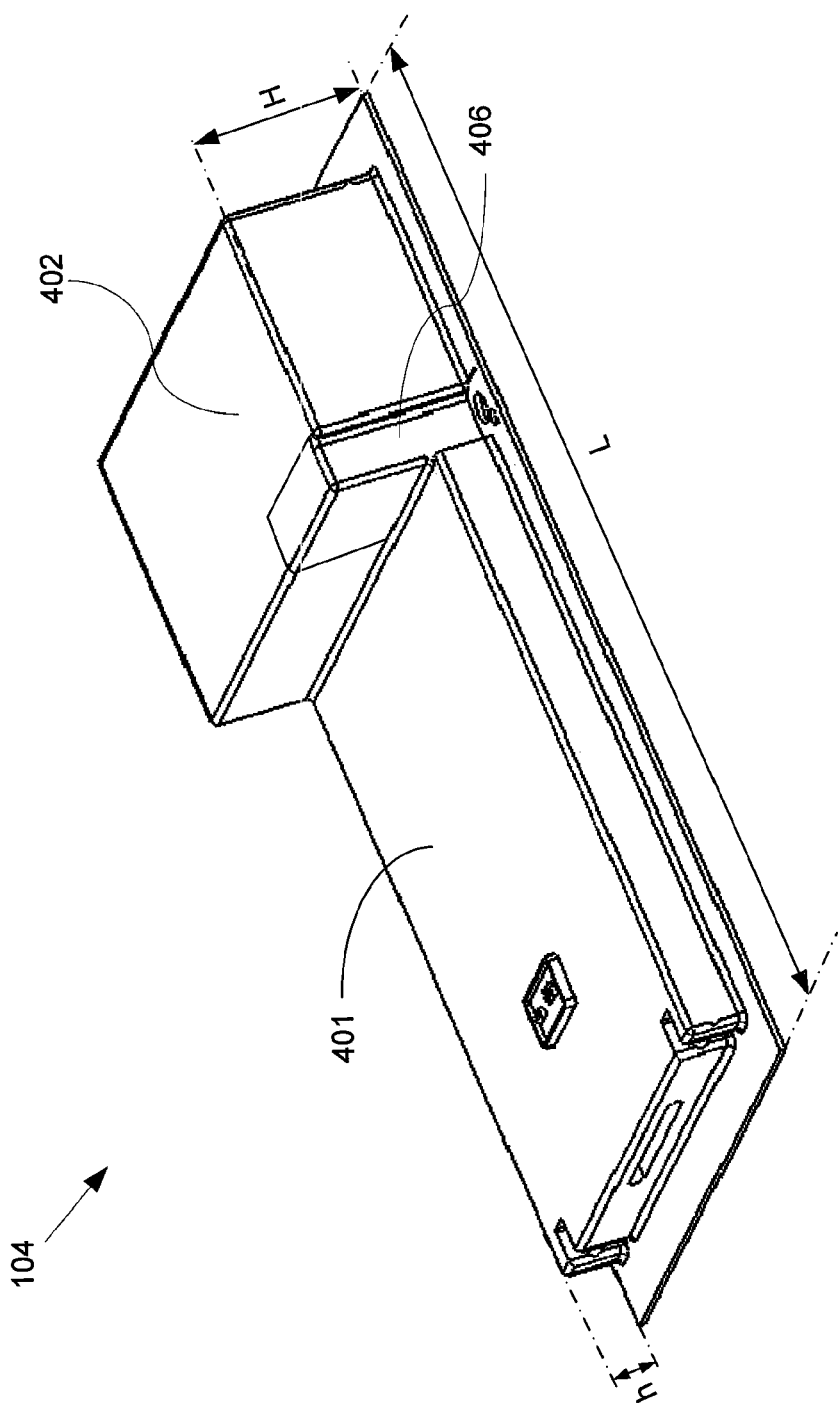
FIG. 4 is a perspective view of one embodiment of the battery pack of FIGS. 1-3.

FIG. 4 is a perspective view of an embodiment of the battery pack 104. In some embodiments, the battery pack 104 has a height (h or H) substantially less than its length (L). In some embodiments, the battery 104 has a first portion 401 being substantially long and flat and a second portion 402 being shorter and thicker than the first portion, i.e., the first portion 401 has a height (h) significantly less than the height (H) of the second portion 402. In some embodiments, the second portion 402 has a greater height (H) as it is configured to fit under or behind the rear passenger seats or in a portion of the trunk, and as such does not significantly impact the passenger space inside the electric vehicle. In some embodiments, the volume of the battery pack 104 is 200 to 300 liters. In some embodiments, the weight of the battery pack 104 is 200-300 kg.

In some embodiments, the battery pack 104 is an at least partially sealed enclosure which is built to substantially enclose and absorb an explosion of battery cells/chemical modules (502, FIG. 5) within the battery pack. The sealed enclosure of the battery pack 104 is made of materials that are able to substantially withstand damage caused by dust, dirt, mud, water, ice, and the impact of small rigid objects. Suitable materials include some plastics, carbon fibers, metals, or polymers, etc. In some embodiments, an external cover on the battery pack 104 protects and insulates the internal components of the battery from harsh environmental conditions and penetration of moisture or fuel vapors.

In some embodiments, a battery management system (BMS) 406 in the battery pack 104 manages the charging and the discharging cycles of the battery pack. The BMS 406 communicates with the vehicle onboard computer to report on the battery's state of charge and to alert of any hazardous operating conditions. In some embodiments, during charging, the BMS 406 communicates with the battery charge station 132. In some embodiments, the BMS 406 can communicate with the vehicle onboard computer via a 9-pin connector. The number of pins in the connector varies depending on the connector design. In some embodiments, the BMS 406 is able to arm and disarm the electric power connector between the battery pack 104 and the vehicle 102 by cutting the current to the connector using a switching device located in the battery pack 104. In some embodiments, the BMS 406 handles substantially all aspects of battery safety issues during charging, operation and storage.

Figure 5:
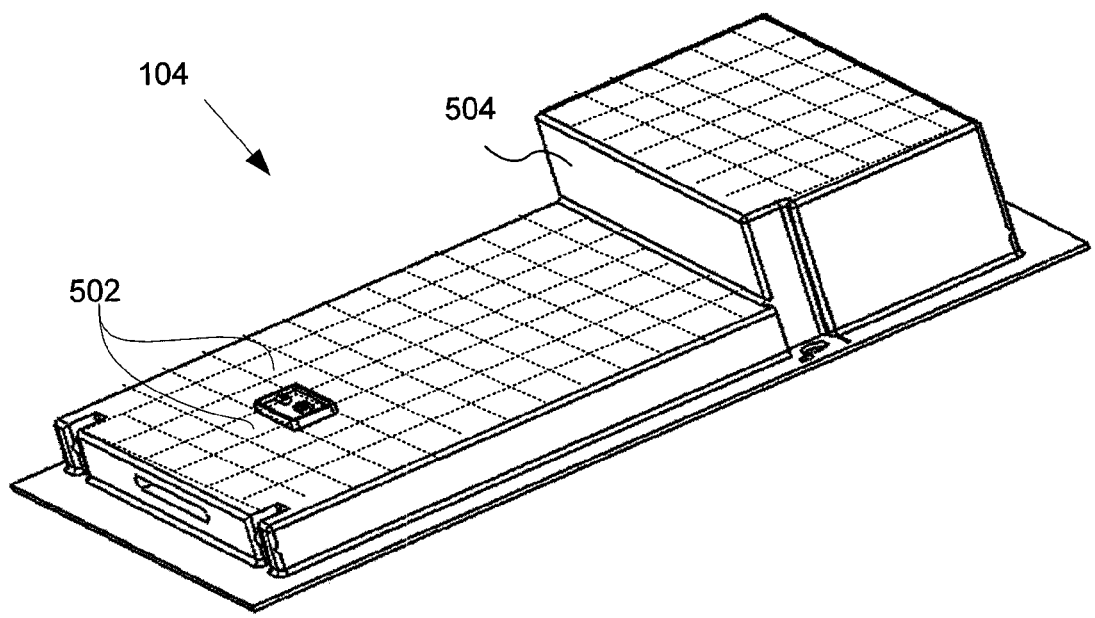
FIG. 5 is a perspective view of one embodiment of the battery pack of FIGS. 1-3 showing various chemical modules or cells.

FIG. 5 is a perspective view of the battery pack 104 with the battery pack chemical modules 502 that receive, store, and discharge electric energy. The modules 502 are housed within a battery pack housing 504. These chemical modules 502 are sometimes referred to herein as rechargeable battery cells 502. In some embodiments, a plurality of chemical modules 502 are disposed within the battery pack 104. In other embodiments, at least one chemical module 502 is used. In most embodiments, each chemical module 502 is rechargeable but there may be instances where a one time use emergency battery could be used. The chemical modules 502 are re-charged as a group at either a charge station 132 or at a charging portion of a battery exchange station 134, based on parameters set and controlled by the BMS.

Figure 6:
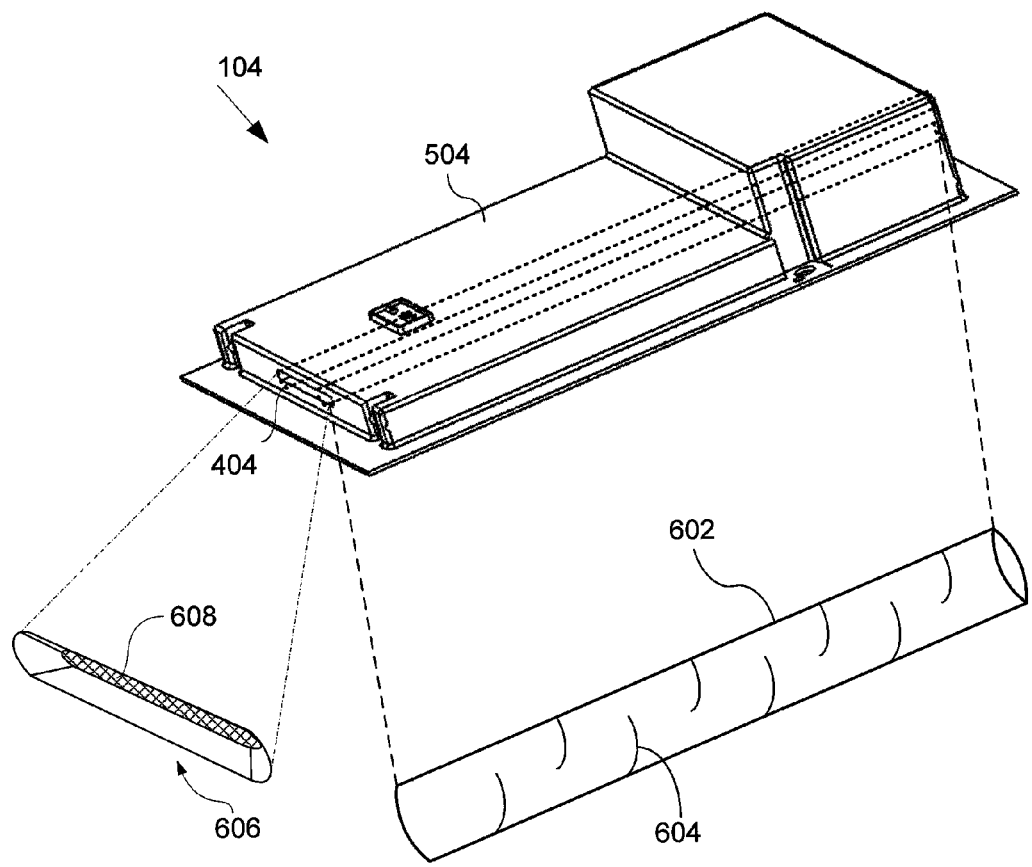
FIG. 6 is a perspective view of one embodiment of a battery pack with a first cooling system.

FIG. 6 is a perspective view of an embodiment wherein the battery pack 104 includes a cooling system which dissipates heat from the battery pack 104. In some embodiments, a portion of the battery pack's housing 504 includes a heat exchange mechanism with at least a portion thereof exposed to ambient air at the underside of the vehicle 102 when the battery pack 104 is attached to the vehicle. In some embodiments, the heat is conducted from the modules 502 to a heat exchanger or heat sink at the bottom section of the battery pack. In some embodiments, the cooling system includes openings 404 in the external cover, which fluidly communicate with one or more cooling ducts 602 that direct ram air flow past the battery to further dissipate heat generated by the battery. In some embodiments, the cooling ducts 602 run the entire length of the battery pack 104 while in other embodiments the ducts take any appropriate path to best cool the modules 502. In some embodiments, the cooling ducts 602 direct air through heat exchangers which dissipate heat from the battery pack modules. In some embodiments, the cooling ducts 602 also include cooling fins 604 therein. In some embodiments, air cooling is accomplished by electric fans. In some embodiments, the inlet 404 comprises a scoop 606 for directing ram air through the ducts 602 while the vehicle is in motion. In some embodiments, the scoop 606 contains a mesh cover 608 for preventing debris from entering the cooling ducts 602.

Figure 7:
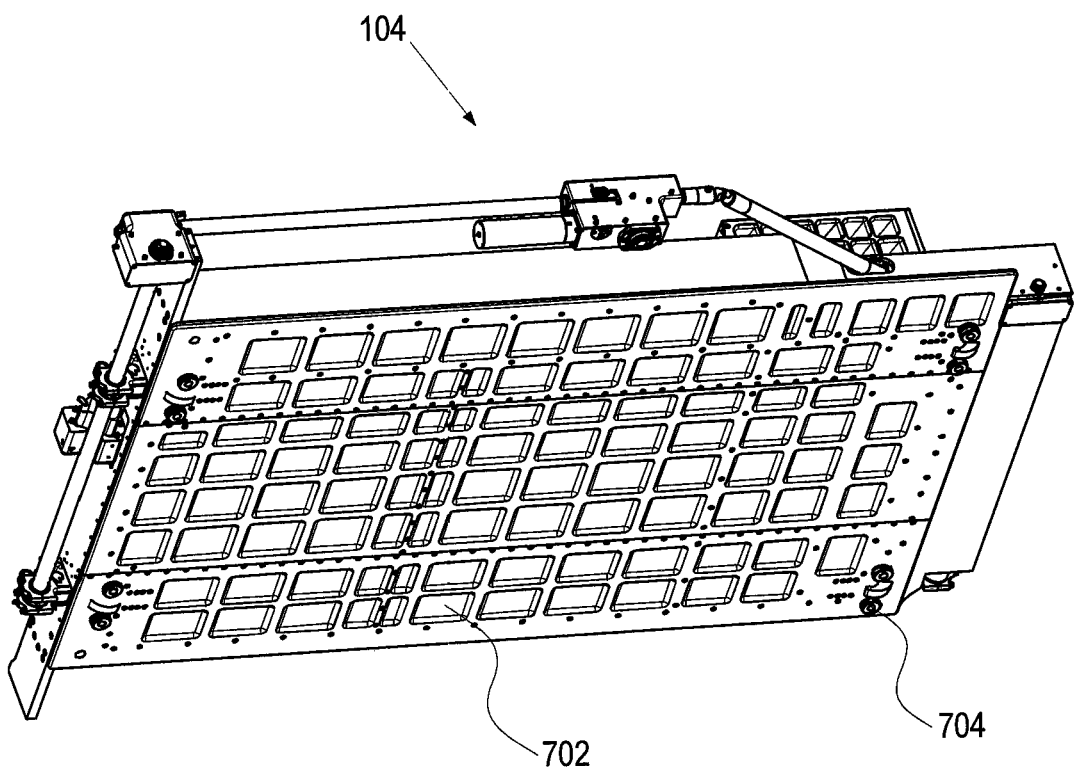
FIG. 7 is a bottom perspective view of another embodiment of a battery pack with a second cooling system.

FIG. 7 is a perspective view of the battery pack 104 and battery bay frame as viewed from the underside of the battery pack. In some embodiments, the battery pack 104 includes another cooling system made up of dimples or cavities 702. The dimples/cavities 702 are located in the bottom surface of the battery pack 104, which runs along the bottom of the vehicle, to be exposed to air passing over them when the vehicle 102 is in motion. Even when the vehicle is stopped, heat generated by the battery is dissipated due to its large surface area and shaded location on the underside of the vehicle. The dimples/cavities 702 increase the overall surface area of the bottom of the battery pack, which further helps to cool the modules 502. In some embodiments, the increased surface area is sufficient for cooling, and ducts and/or heat exchangers are not necessary. In some embodiments, this increased surface area is used in conjunction with one or more of the previously described cooling mechanisms (such as the cooling ducts with fins described in FIG. 6, or the heat sink and heat exchanger also described above.)

In some embodiments, battery pack cooling systems, such as those described above in relation to FIGS. 6 and 7, are capable of dissipating a majority of the heat generated during full power operation and/or during the charging process. In some embodiments, the cooling systems are capable of dissipating 3 KW of heat. The exact amount of heat emitted from the battery varies from one design to another. In some embodiments, the heat from the cooling systems described above is substantially emitted to the environment rather than to other parts of the vehicle 102.

FIG. 7 also shows an embodiment with a plurality of pilot holes 704 on the underside of the battery pack 104. These pilot holes 704 mate with locating pins on an exchange device platform discussed in application Ser. No. 61/166,239 (filed Apr. 2, 2009, entitled Battery Exchange Station and incorporated herein) to help properly align the exchange device platform with the battery pack 104. In some embodiments, one pilot hole is present. In other embodiments, two or more pilot holes are present. The embodiment of FIG. 7 shows pilot holes on either side of every striker on the battery. In some embodiments, the pilot holes 704 exist in the frame of the battery bay rather than the battery, and function substantially the same, i.e., to facilitate proper alignment of the exchange platform during a battery exchange operation.

Figure 8:
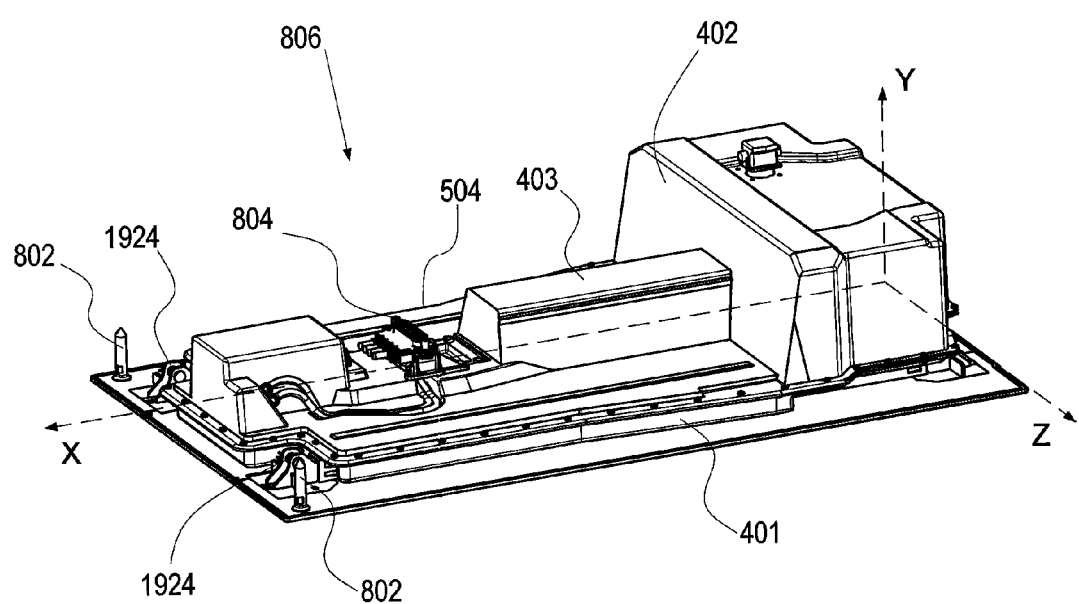
FIG. 8 is a perspective view of another embodiment of a battery pack.

FIG. 8 is a perspective view of another embodiment a battery pack 806. The battery pack 806 has a first portion 401 being substantially long and flat; a second portion 402 being shorter and thicker than the first portion; and a third portion 403 of the battery pack 104 being long and thin and running substantially the length of the first portion 401 with a height larger than the first portion 401 but smaller than or equal to the height of the second portion 402. The third portion 403 of the battery 104 protrudes in the Y-direction from the first portion 401 along a central axis in the X-direction formed between the driver and passenger seats, as shown. Still other embodiments (not shown) have a substantially cuboid shape, without two differently shaped portions. Other embodiments may have more complex shapes. For example, some embodiments are taller than they are wide. Embodiments of this general shape are sometimes located behind a passenger space, rather than underneath it.

In some embodiments, the battery pack 104 includes one or more pins 802 to align the battery 104 with the battery bay 108 of the vehicle 102. The pins 802 may also be used to prevent the battery pack from being inserted in the battery bay 108 in the wrong direction. For example, the pins at the battery and corresponding openings in the battery bay may be keyed to one another.

In some embodiments, the battery pack housing 504 further comprises bar shaped strikers 1924, which are firmly attached to the battery pack housing and configured to carry the entire weight of the battery pack 104, i.e., the battery pack can be suspended from the strikers 1924 when they are engaged with latches 1920 (FIG. 19A) on the battery bay 108. All versions of the battery pack 104 also contain an electrical connector 804 (discussed below in relation to FIG. 9), for quickly and safely connecting and disconnecting the battery pack 104 to and from the vehicle 102. In some embodiments the electrical connector 804 is located on the third portion 403 of the battery 104, but in other embodiments, it may be located anywhere on the pack.

Figure 9:
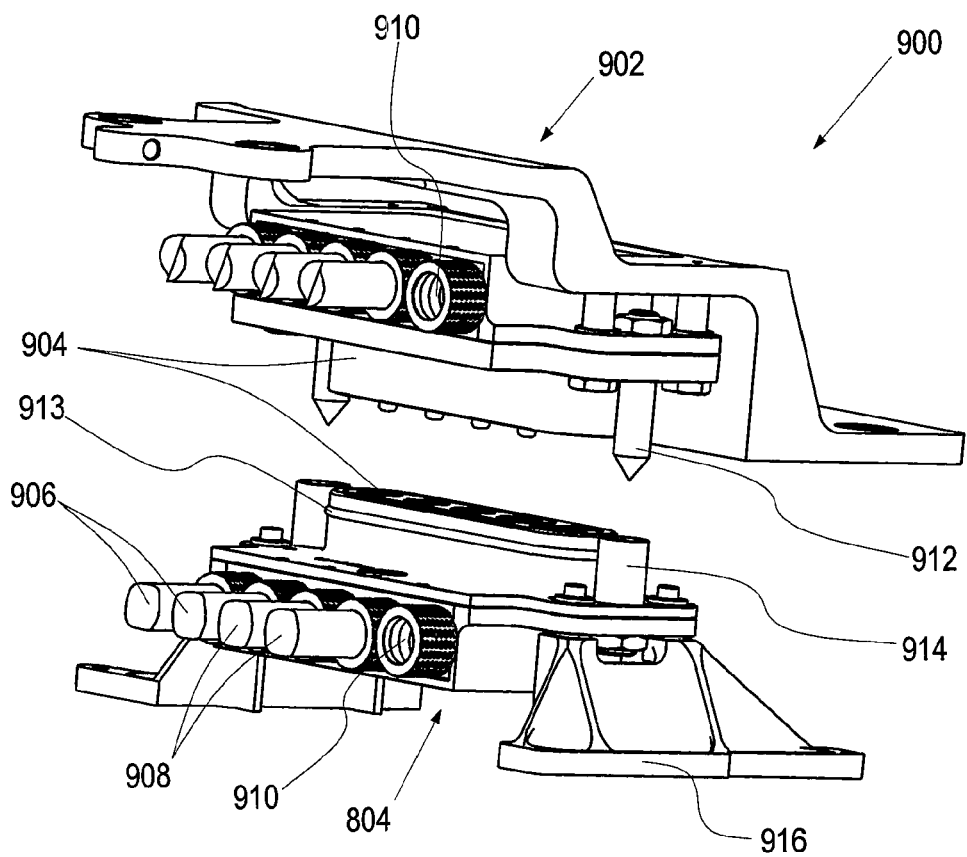
FIG. 9 is a perspective view of an electrical connection system.

FIG. 9 is a detailed perspective view of the electrical connection system 900. This figure shows both the battery electrical connector 804 as well as the corresponding battery bay electrical connector 902 which mate together to form the electrical connection system 900. The battery electrical connector 804 is attached to the battery pack 104 by means of a base unit 916. Similar attachment mechanisms are used to attach the battery bay electrical connector 902 to the frame 118 of the battery bay 108 or to the electric vehicle 102 directly. In some embodiments, the electrical interface between the battery bay 108 and the battery pack 104 (i.e. the connection between the bay electrical connector 902 and the battery pack electrical connector 804) allows for quick connect/disconnection between the pack and the bay or vehicle.

Both connectors also include electric shields 904 to shield the electro-magnetic forces of the connections from interfering with the chemical modules/battery cells 502. The electric shield may be grounded. In some embodiments, the electric shield 904 also comprises an O-ring 913 to prevent moisture and debris from fouling the electrical connectors and causing electrical shorts and/or fires. The alignment between the bay electrical connector 902 and the battery pack electrical connector 804 is facilitated by one or more tapered alignment pins 912 and corresponding alignment receptacles or sockets 914. In some embodiments, the alignment pins 912 are on the battery pack electrical connector 804 while the alignment sockets/receptacles 914 are on the bay electrical connector 902. In other embodiments, the arrangement is transposed. In some embodiments, the pins 912 are keyed to one another to prevent inappropriate mating of the electrical connectors.

In some embodiments, the electric connections between the battery bay 108 and the battery pack 104 have two separate groups of connectors. The first group of connectors is for power (approximately 400 VDC, 200 Amp) to and from the battery pack 104. The second group of connectors 910 is for data communications (5-12V, low current.) In some embodiments, the connector has 9 pins. In other embodiments the connector will have more or fewer pins than 9.

In some embodiments, the first group of connectors includes a first pair of connectors 906 for power to the battery pack 104 from a charging mechanism. In some embodiments, the charging mechanism is a stand alone charging station 132 that connects to the vehicle 102 and charges the battery pack 104 while it is still coupled to the vehicle (as shown in FIG. 1). In some embodiments, the charging mechanism is incorporated into a portion of the battery exchange station (134, FIG. 1), where the depleted/discharged battery pack 104 that has been removed from a vehicle 102 is charged again before being inserted into a vehicle. In some embodiments, the first group of connectors also includes a second pair of connectors 908 to provide power from the battery pack 104 to the electric motor 103.

In some embodiments, the battery electrical connector 804 as well as the corresponding battery bay electrical connector 902 mate together as a result of the translation of the battery pack 104 into the battery bay 108. Both the battery electrical connector 804 as well as the corresponding battery bay electrical connector 902 have some flotation, i.e., they can travel a few millimeters to the left and right. The male connector (battery bay electrical connector 902 in this embodiment) has alignment pins 912 which penetrate into sockets 914 in the female connector (the battery electrical connector 804 in this embodiment). The connection between the pins 912 and the sockets 914 and this aligns the two parts of the electrical connection system 900 during the translation of the battery pack 104 to its final position in the battery bay 108. The flotation of the two parts of the electrical connection system 900 allows some misalignments (due to production and assembly tolerances) of the two connector parts.

Figure 10:
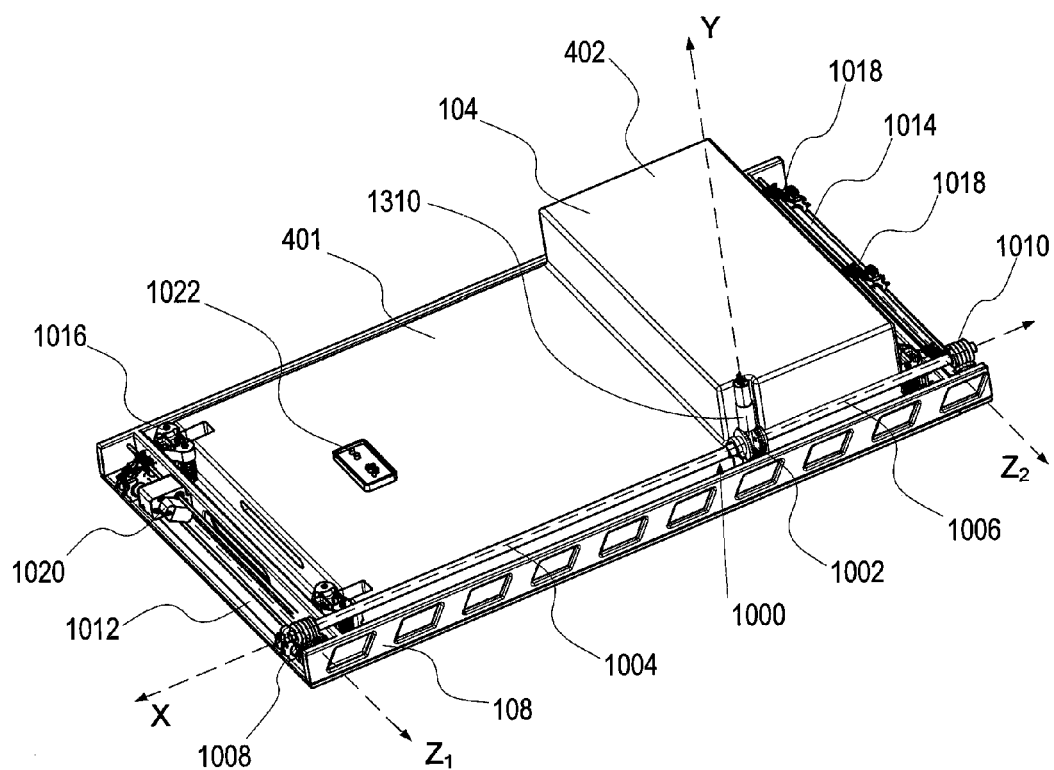
FIG. 10 is a perspective view of an embodiment of a battery pack connected to a battery bay and the battery bay's transmission assembly.

In some embodiments, the electrical connectors 906, 908, and 910 in the electrical connection system 900 align and connect themselves automatically only after the mechanical connections (i.e., the locking of the battery pack 104 into the battery bay 108 by means of the latch mechanisms 1016, 1018 in the transmission assembly 1000, described in FIGS. 10 and 19) have been established.

FIG. 10 is a perspective top side view of one embodiment of the battery pack 104 connected to the battery bay 108. In this embodiment the battery pack 104 and battery bay 108 are substantially cuboid/rectangular parallelepiped in shape. This embodiment includes a battery electrical connector 1022 being on one side of the first portion 401.

In some embodiments, the battery bay 108 includes a battery bay transmission assembly 1000. The transmission assembly 1000 is a grouping of gears, rotating shafts, and associated parts that transmit power from a drive motor 1310 or alternatively from an external/manual rotation source (such as the wrench received within a drive socket 1308 shown in FIG. 13). The latch mechanisms 1016, 1018 as will be explained in detail below with regard to FIG. 19.

In some embodiments, the transmission assembly 1000 includes a first gear set 1002 (such as a miter gear set) which drives a first gear shaft 1004 and a second gear shaft 1006 in opposite directions. The rotational force about the Y-axis by the drive motor 1310 or manual rotation is translated by the first gear set 1002 into equal and opposite rotational forces of the gear shafts 1004, 1006 about the X-axis. The first gear shaft 1004 is attached to a second gear set 1008 (such as a first worm gear set). The second gear shaft 1006 is attached to a third gear set 1010 (such as a second worm gear set). The second and third gear sets 1008, 1010, which are discussed in more detail below with respect to FIG. 12, connect each gear shaft 1004, 1006 to respective torque bars 1012, 1014 which permits the power flow to turn a corner around the battery bay. In other words, the rotational force of the gear shaft 1004 about the X-axis is translated by the gear set 1008 into a rotational force of torque bar 1012 about the $Z_1$-axis, while at the same time the rotational force of gear shaft 1006 about the X-axis (in an equal and opposite direction to that of gear shaft 1004) is translated by gear set 1010 into a rotational force of torque bar 1014 about the $Z_2$-axis (in an equal an opposite direction to the rotation of torque bar 1012.) By this means, the transmission assembly 1000 drives the torque bars 1012, 1014 to substantially simultaneously rotate in equal but opposite directions.

In some embodiments, the torque bars 1012, 1014 and gear shafts 1004, 1006 are at right angles to one another respectively. In some embodiments, the torque bars 1012, 1014 and gear shafts 1004, 1006 form an obtuse angle with each other, and in further embodiments they form an acute angle with one another. In this embodiment second gear set 1008 connects the first gear shaft 1004 to the first torque bar 1012, and the third gear set 1010 connects the second gear shaft 1006 to the second torque bar 1014. As such, in some embodiments, the first gear shaft 1004 and the second gear shaft 1006 substantially simultaneously rotate in opposite directions causing the first torque bar 1012 and the second torque bar 1014 to substantially simultaneously rotate in opposite directions via the second gear set 1008 and third gear set 1010.

The embodiment shown in FIG. 10 shows two latch mechanisms 1016, 1018 attached to each torque bar 1012, 1014. These latches 1016, 1018 hold the battery pack 104 at least partially inside the battery bay 108 during normal operation of the vehicle.

Some embodiments include one or more first latches 1016 coupled to the first torque bar 1012 and one or more second/additional latches 1018 coupled to the second torque bar 1014. The first torque bar 1012 is configured to actuate the first latch mechanism(s) 1016, whereas the second torque bar 1014 is configured to actuate the second latch mechanism(s) 1018. When more than one of the first latches 1016 or second latches 1018 are attached to each torque bar 1012, 1014 the torque bar ensures that the plurality of latches actuated and thus rotating substantially simultaneously with each other.

Figure 20:
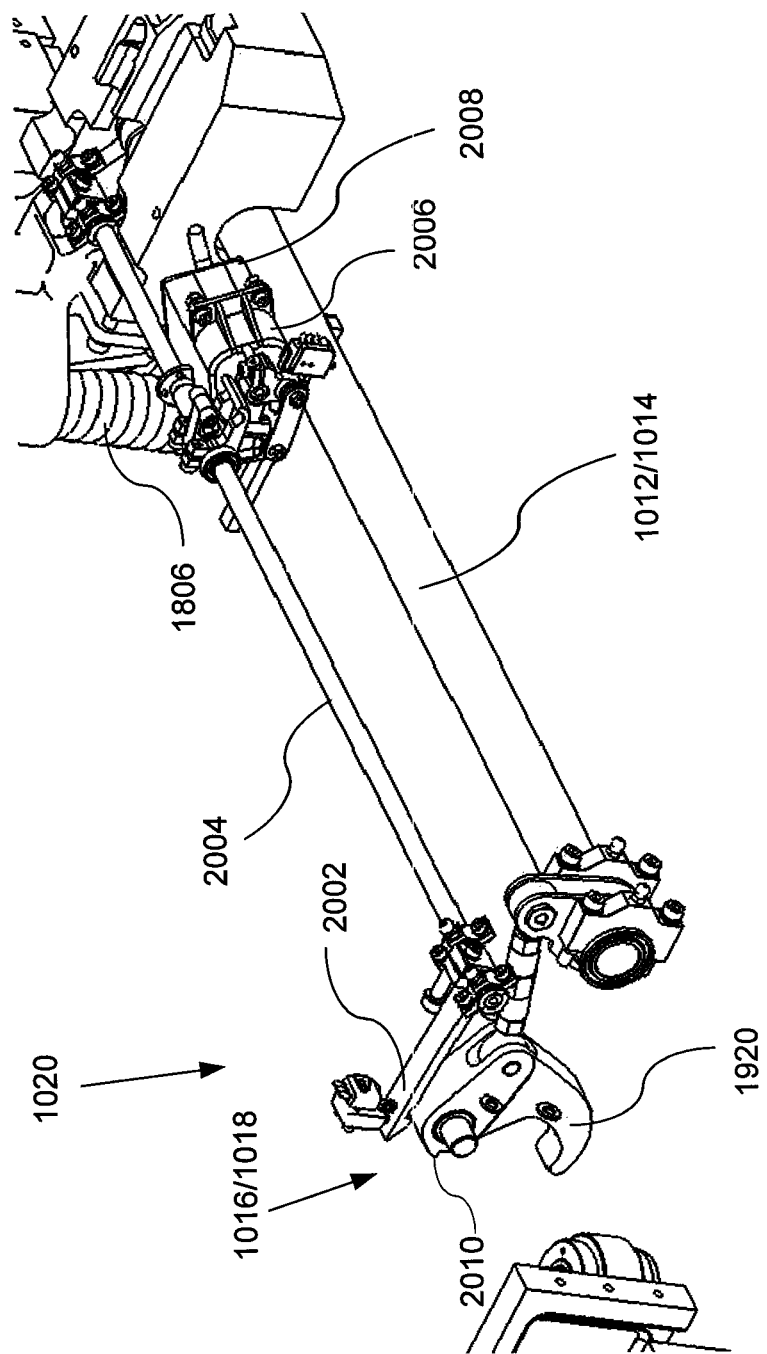
FIG. 20 is a close-up perspective view of the latch lock mechanism of the battery bay.

At least one latch lock mechanism 1020 prevents the latches 1016, 1018 from releasing the battery 104 from the battery bay 108 until the lock is disengaged as described in more detail in relation to FIG. 20. In some embodiments, only one latch lock mechanism 1020 is used, while in other embodiments at least one latch lock mechanism 1020 is attached to each torque bar 1012, 1014. In some embodiments, the latch lock 1020 is electronically activated, while in other embodiments it is mechanically activated.

In some embodiments, the first torque bar 1012 is located at a side of the battery bay 108 nearest to the front end of the vehicle 102, and the second torque bar 1014 is located at a side of the battery bay 108 nearest to the rear of the vehicle, or the arrangement may be transposed. The gear sets and mechanisms of the transmission assembly may be located anywhere so long as the torque bars 1012, 1014 are driven in opposite directions simultaneously at the same angular velocity to actuate the latch mechanisms 1016, 1018.

Figure 11:
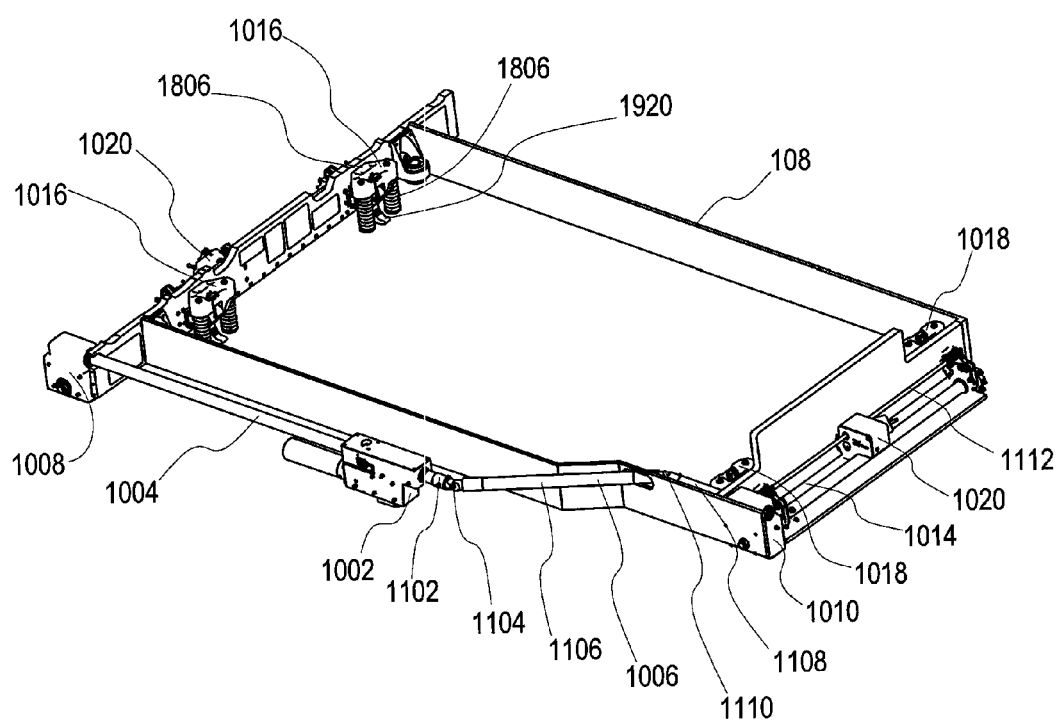
FIG. 11 is a perspective view of another embodiment of a battery bay.

FIG. 11 is a perspective view of another embodiment of a battery bay 108. This embodiment also includes a first gear set 1002 (such as miter gear set) that drives a first gear shaft 1004 and a second gear shaft 1006 in opposite directions. In this embodiment, however, the battery bay's frame is not rectangular in shape. Instead, along one side of the battery bay 108, the second gear shaft 1006 is made up of three portions, a first gear shaft link 1102 connected by a first universal joint 1104 to a second gear shaft link 1106, and a third gear shaft link 1108 connected by a second universal joint 1110 to a third gear shaft link 1112. In this manner the first gear shaft 1006 is bent to accommodate for other components of the electric vehicle 102. As such, the battery bay 108 cavity has a smaller volume than it would have were the first gear shaft 1006 a single straight component extending from the first gear set 1002.

FIG. 11 also shows a lock synchronization bar 1112 in the transmission assembly 1000 which is located near each torque bar 1012 (FIG. 10), 1014. Each lock synchronization bar 1112 is attached to a latch lock mechanism 1020 to keep its respective latch mechanisms 1016, 1018 from releasing, as will be explained in detail below with respect to FIG. 20. FIG. 11 also shows springs 1806 in the latch mechanisms 1016, 1018 which are located on either side of the latch 1920 as explained in more detail in FIG. 18.

It should be noted that while various forms of shafts and gear sets have been described above, in other embodiments the driving torque can be transmitted to the latches by using other types of drive components such as belts, pulleys, sprockets drive chains.

Figure 12:
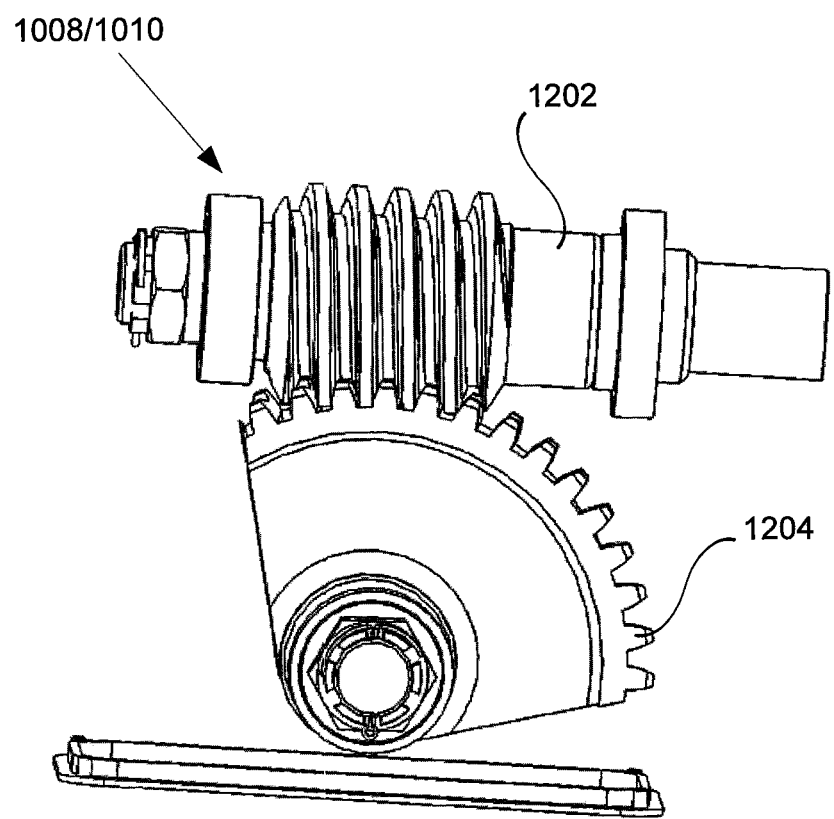
FIG. 12 is a close-up oblique view of an embodiment of the worm gear set of FIG. 11.

FIG. 12 shows one embodiment of the second and third gear sets 1008, 1010. In some embodiments the gear sets 1008, 1010 are each made up of a helical gear 1202 and a spur gear 1204. In some embodiments, the helical gear 1202 is a worm gear. In operation, the rotation of the helical gear 1202, which is connected to the gear shafts 1004, 1006, rotates the corresponding torque bar 1012, 1014 by means of interlocking teeth on the helical gears 1210 and spur gear 1204. The precise number and configuration of teeth on the helical gear 1210 and the spur gear 1204 varies depending on the particular electric vehicle 102. For example, in some embodiments the helical gear 1202 is significantly longer and has more threading, while in some embodiments, the spur gear 1204 gear has more teeth, or forms a complete circle. In other embodiments the diameter of the helical gear 1202 is larger than the proportions shown in FIG. 12. In normal operation, the helical gear 1202 turns the spur gear 1204 in one direction to engage the latch mechanisms 1016, 1018 by which the battery 104 is lifted and locked into the battery bay 108, and the helical gear 1202 turns the spur gear 1204 in the opposite direction to disengage the latch mechanisms 1016, 1018 and allow the battery 104 to be removed from the battery bay 108.

Figure 13:
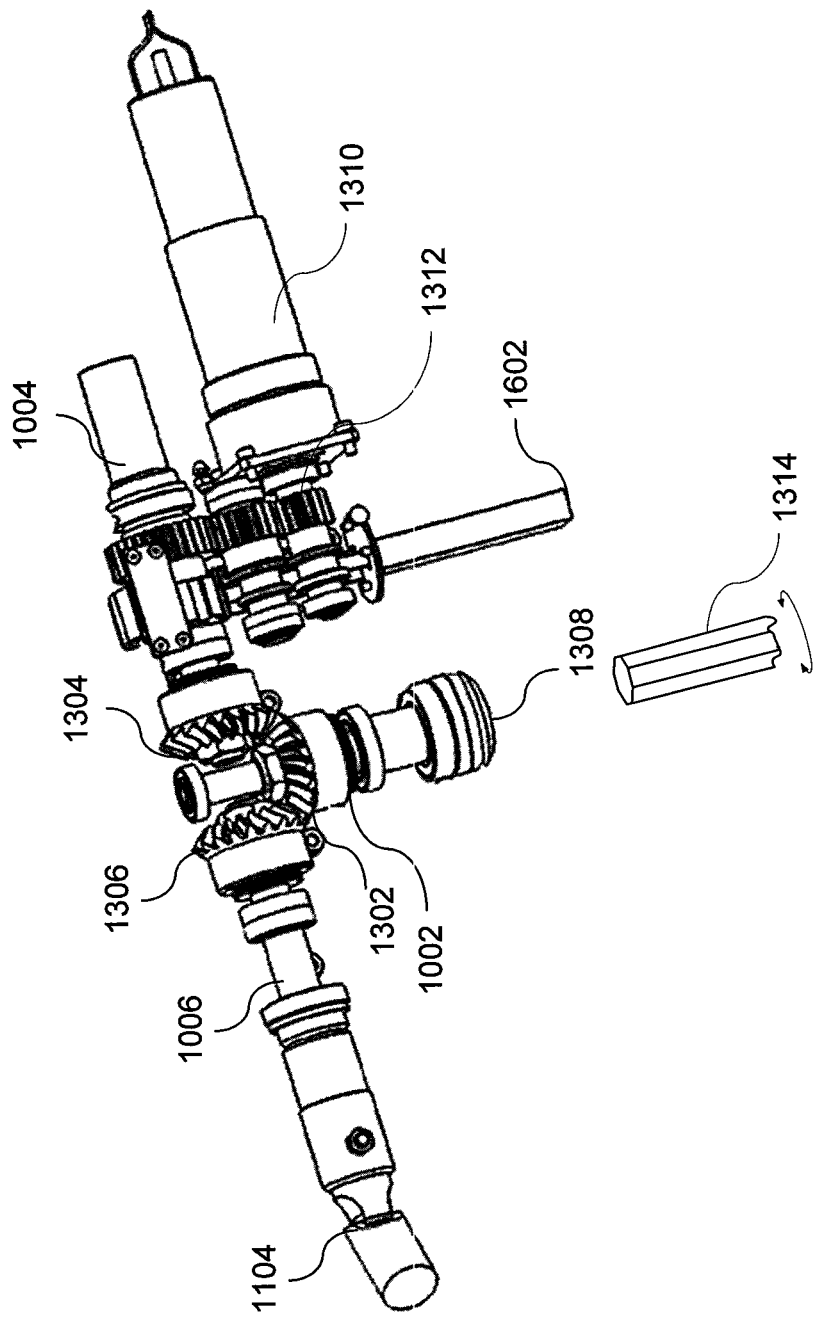
FIG. 13 is a close-up perspective view of an embodiment of a first gear set mechanism of FIG. 11.

FIG. 13 shows a detailed view of one embodiment of the first gear set 1002. In some embodiments, the first gear set 1002 is a miter gear set. In some embodiments, the miter gear set 1002 comprises three helical bevel gears; including a central gear 1302 coupled to a first outer gear 1304 and a second outer gear 1306. As the central gear 1302 rotates it drives the first outer gear 1304 in a first rotational direction and the second outer gear 1306 in a second rotational direction opposite of the first rotational direction. The first outer gear 1304 drives the first gear shaft 1004, while the second outer gear 1306 drives the second gear shaft 1006. As such, the rotation of the central gear 1302 drives the first gear shaft 1004 in a first rotational direction by means of the first outer gear 1304 while simultaneously/synchronously driving the second gear shaft 1006 in a second rotational direction by means of the second outer gear 1306. In some embodiments, the first gear set 1002, specifically the central gear 1302 is driven by the rotation of a drive socket 1308 located at the underside of the electric vehicle 102. To turn the gear 1308, the shaft is mechanically rotated, such as by an Allen or socket wrench 1314 configured to mate with the drive socket 1308. In some embodiments, the female drive socket 1308 has an unusual or non-standard shape such that it can only receive a particular shaped Allen or socket wrench 1314 made to mate with the non-standard shaped drive socket 1308.

In some embodiments, the transmission assembly 1000 is driven by an electric drive motor 1310 through the drive motor gear ratio set 1312. The gear ratio set 1312 drives the first gear set 1302, which drives the first gear shaft 1004 and the second gear shaft 1006 simultaneously in opposite directions to eventually simultaneously actuate the latch mechanisms 1016, 1018 as described above with relation to FIG. 10. In some embodiments, the drive motor 1310 is used in most circumstances to rotate the shafts 1004, 1006, while the drive socket 1308 is only used for manual override situations. In some embodiments, the drive socket 1308 is the preferred means for driving the first gear set 1002.

Figure 23A:
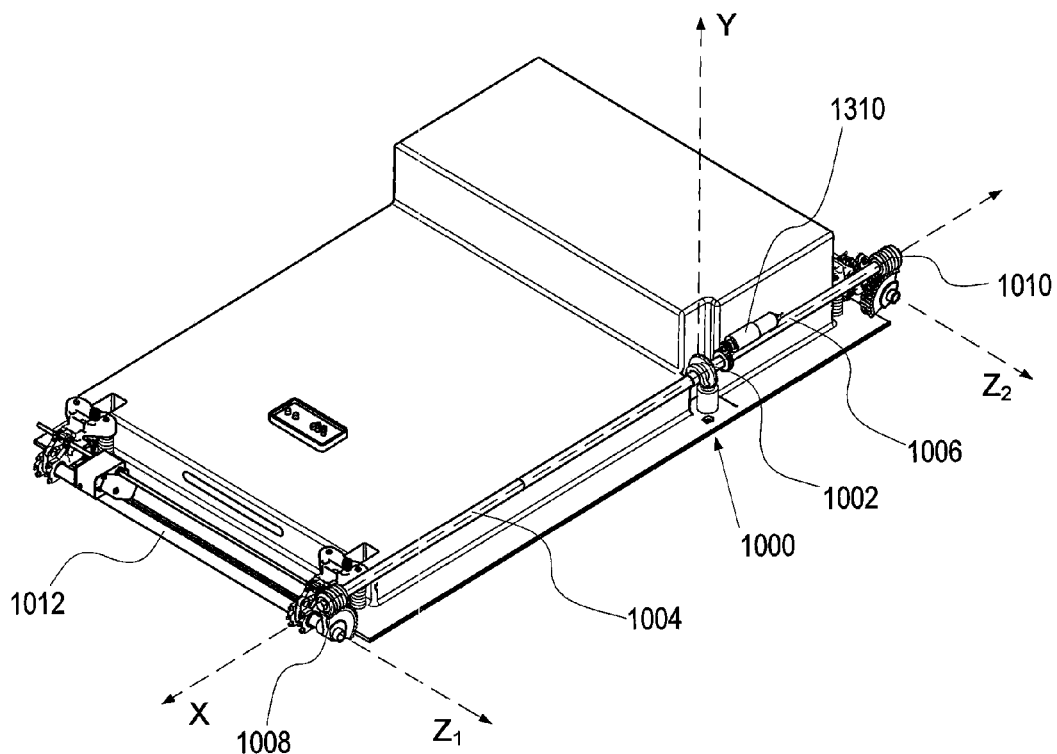
FIGS. 23A and 23B are perspective and close-up perspective views respectively of another embodiment of a transmission assembly of a battery bay.
Figure 23B:
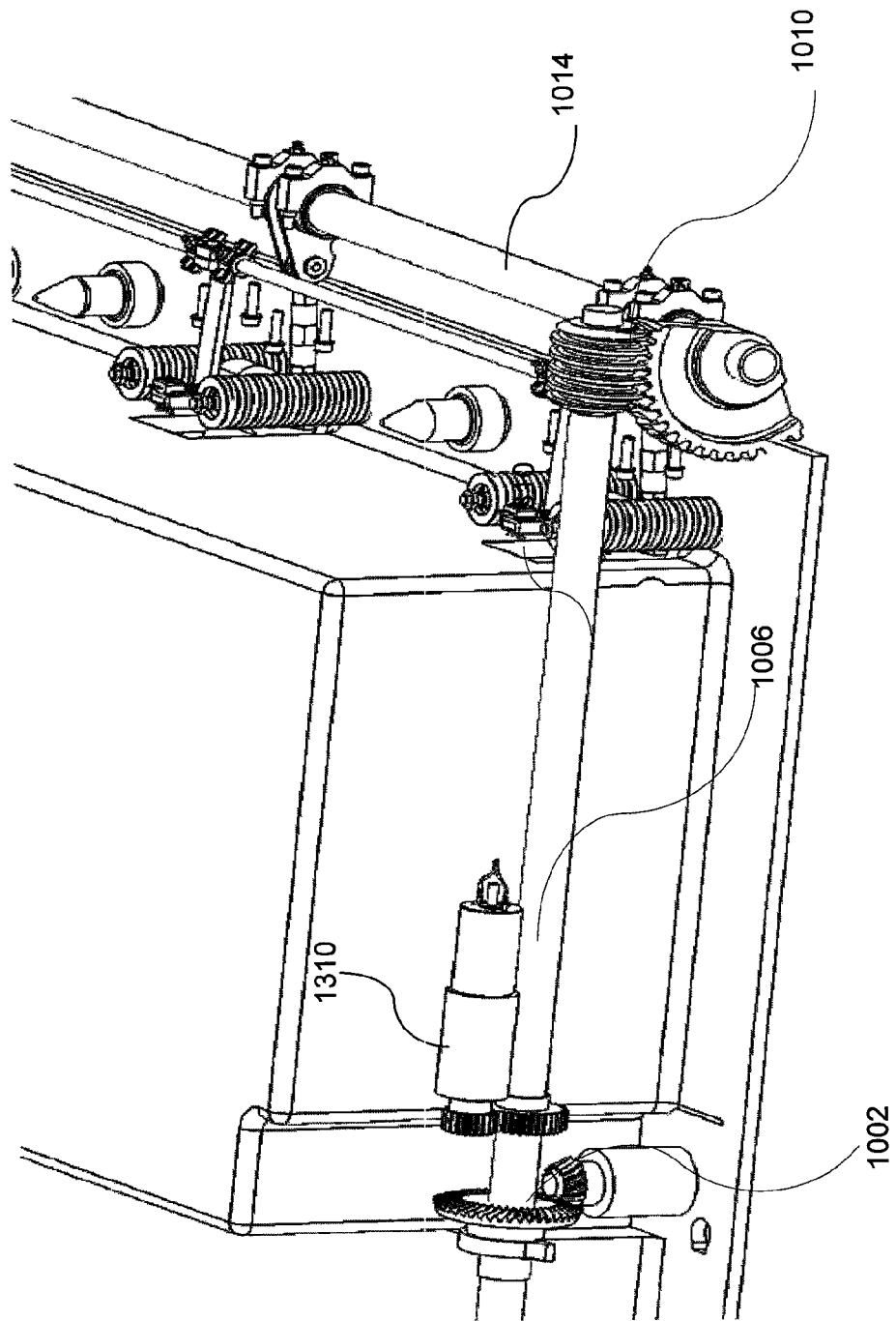

As shown in FIGS. 23A and 23B, in some embodiments, the transmission assembly 1000 encompasses a second gear set 1008 which is a right worm gear set and third gear set 1010 which is a left worm gear set. When right gear set 1008 and the left worm gear set 1010 are used in the transmission assembly 1000, the first gear shaft 1004 and the second gear shaft 1006 need not be driven to rotate in opposite directions about the X-axis. Instead, the torque bar 1012 is driven about the $Z_1$-axis and torque bar 1014 is driven about the $Z_2$-axis (in an equal an opposite direction to the rotation of torque bar 1012) by means of the opposite threading on the right and left worm gears (1008, 1010). In other words, the pitch of the threading on the right worm gear 1008 is opposite to the pitch of the threading on the left worm gear 1010. As such, the first gear set 1002 need not be a miter gear set as shown in FIG. 13, but is instead a simpler gear set shown in FIG. 23B. In other words, because the right and left worm gears 1008, 1010 translate the motion of the first gear set 1008 in directions opposite from one another due to their opposing thread pitch, the shafts 1004, 1006 can rotate the same direction, and a complex miter gear set is not needed at the point of actuation of the shafts 1004, 1006.

Figure 14:
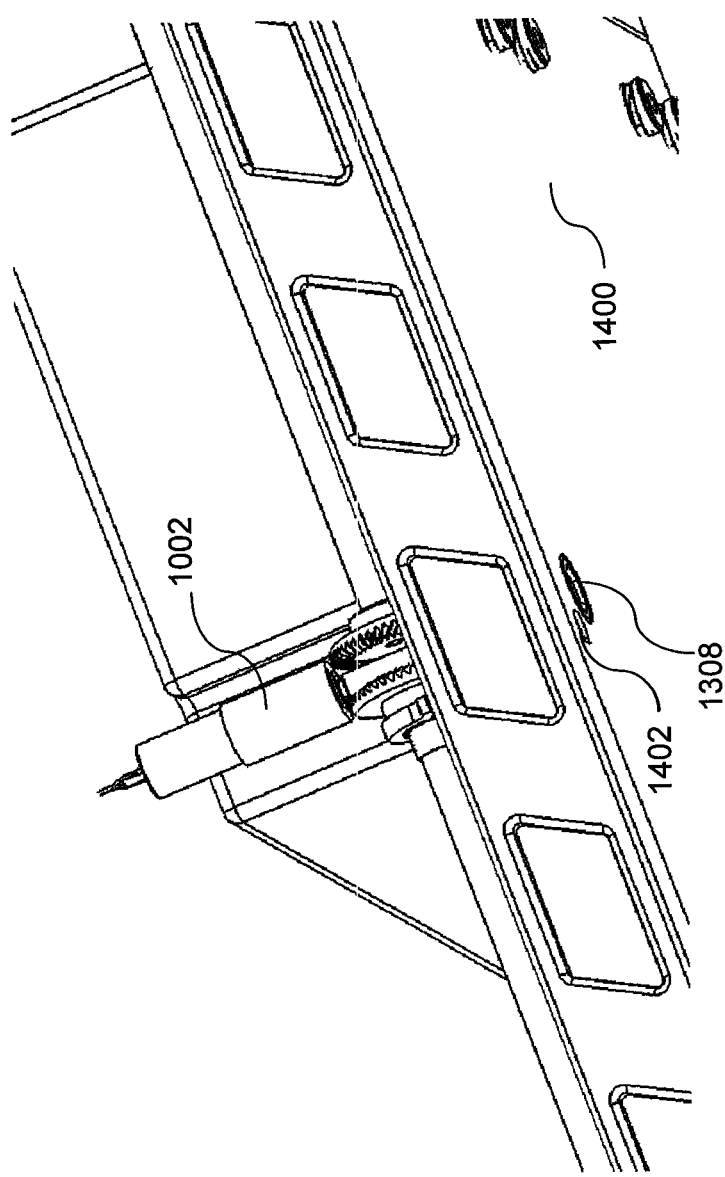
FIG. 14 is a close-up perspective view of the underside of the battery and bay including a close-up view of an embodiment of a drive socket.

FIG. 14 shows a bottom perspective view of another embodiment of the drive socket 1308 as viewed from the underside of the at least partially electric vehicle 102. In some embodiments, the drive socket 1308 is accessible through a hole in the battery pack housing 1400. In other embodiments, the drive socket 1308 is accessible at the side of the cavity 302 in the battery bay 108. In some embodiments, the first gear set 1002 is driven by the socket wrench 1314 only after a key 1602 has been inserted into a key hole 1402 and unlocks the first gear set 1002 as described in FIG. 17. Like the drive socket 1308, in this embodiment, the key hole 1402 is also located at the underside of the electric vehicle 102 and requires a hole in the battery housing 1400. In other embodiments, the key hole 1402 is in the battery bay 108.

Figure 15:
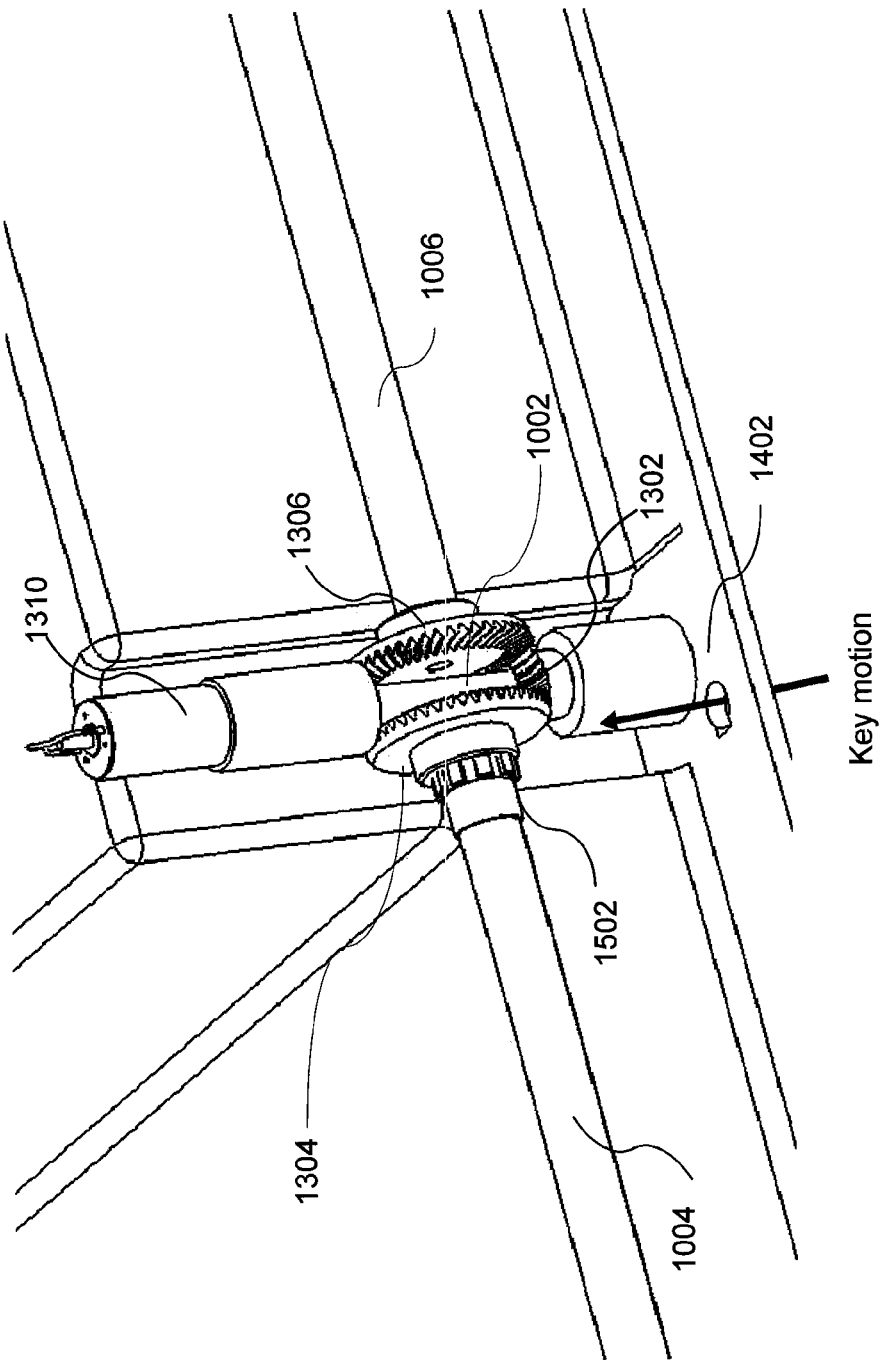
FIG. 15 is a perspective view of one embodiment of a gear lock.

FIG. 15 is a perspective view of one embodiment of a first gear lock 1502 (which in some embodiments is the miter gear lock). In this embodiment, when a key is inserted into the key hole 1402, as depicted by the arrow in the figure, the first gear lock 1502 rotates upward and disengages from a small gear on the shaft 1004 and thus is unlocked. Then, the first gear set 1002 can then perform its function of rotating the central gear 1302, which drives the first gear shaft 1004 in a first rotational direction by means of the first outer gear 1304 while simultaneously driving the second gear shaft 1006 in a second rotational direction (opposite the first rotational direction) by means of the second outer gear 1306. When the key is removed the first gear lock 1502 rotates downward and engages the small gear on the shaft 1004 and thus locks it. In the embodiment shown in FIG. 15, the electric drive motor 1310 of the transmission assembly 1000 is located above the first gear set 1002, and as such does not require a drive motor gear set 1312 as described in FIG. 13.

Figure 16:
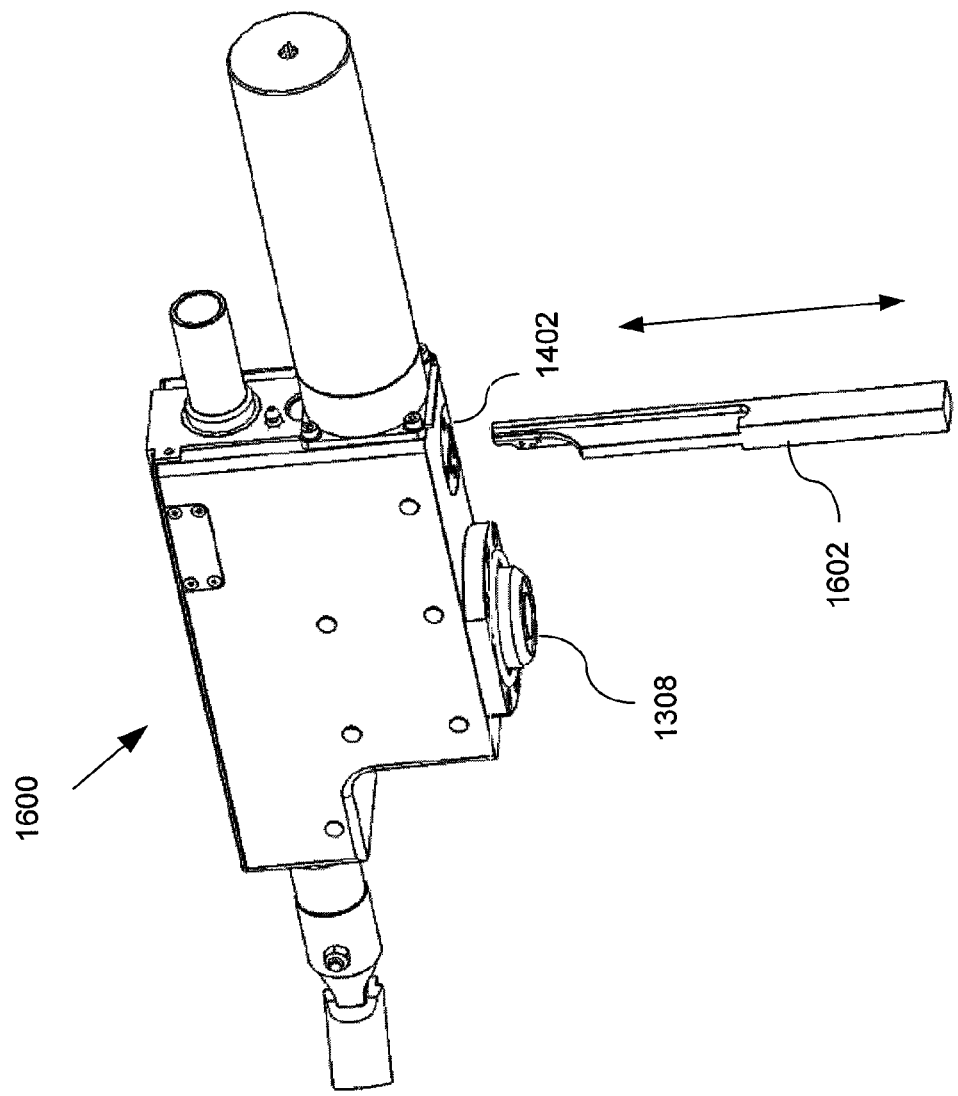
FIG. 16 is a perspective view of another embodiment of a gear lock.

FIG. 16 is a perspective view of a second embodiment of the gear lock 1600. In this figure the key 1602 is shown outside of the key hole 1402. In some embodiments, the key hole 1402 is located close to the drive socket 1308. In some embodiments, the key 1602 has a specific and unconventional shape for mechanically releasing the second embodiment of the gear lock 1600, explained in more detail below, while avoiding other components of the first gear set 1002.

Figure 17:
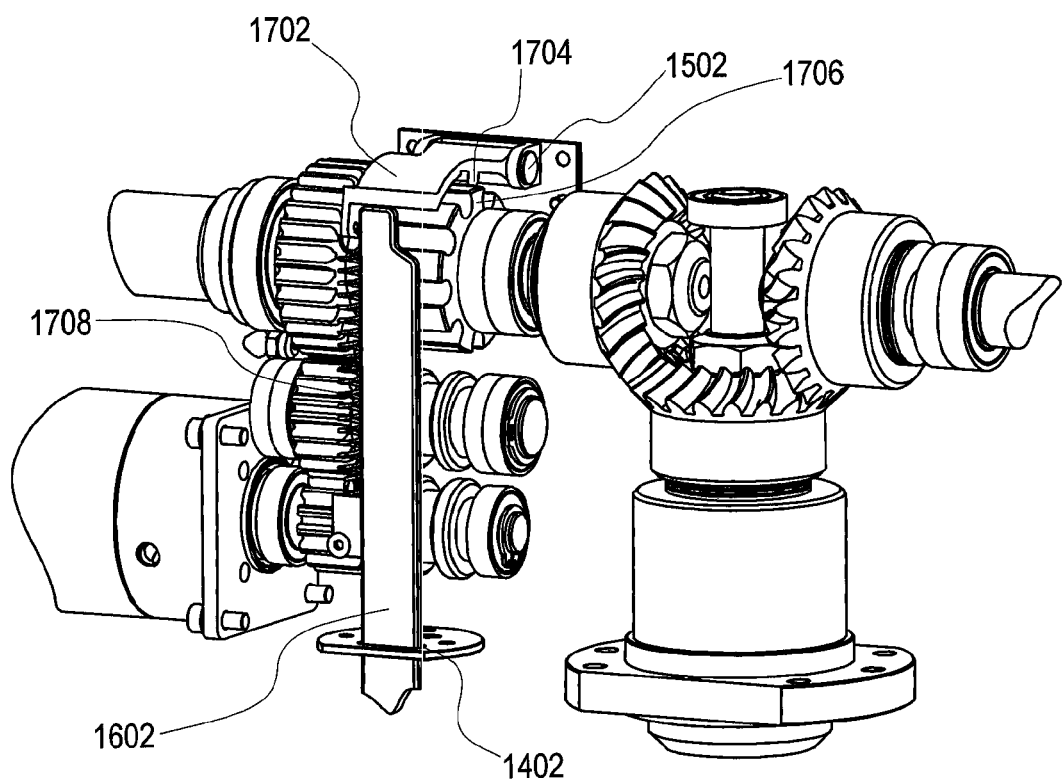
FIG. 17 is a close-up perspective view of a key inserted into a key hole and releasing the gear lock of FIG. 16.

FIG. 17 is a detailed view of the key 1602 inserted into the key hole 1402 and releasing the first gear lock 1502. In FIG. 17, the first gear lock 1502 is positioned in-between the motor 1310 and the gear set 1312. In some embodiments, the key 1602 unlocks the first gear lock 1502 by pushing a locking latch 1702 with a locking tooth 1704 away from a locking gear 1706. In some embodiments, the locking latch 1702 is designed to be biased into its locked position, i.e., mated with the locking gear 106, as soon as the key 1602 is removed. In some embodiments, a spring 1708 is attached to the locking latch 1702 to provide the biasing force, while in other embodiments gravity or other mechanisms for biasing the locking latch 1702 may be used. In some embodiments, the key 1062 remains in the inserted position throughout the battery exchange process. In other embodiments the key 1602 is only required to originally unlock the first gear lock 1502, but is not required to remain in place throughout the battery exchange process.

In all of the embodiments of the key 1602 and first gear lock 1502, like those shown in FIGS. 15-17, the first gear set 1002 is kept from rotating until the key 1602 unlocks the gear lock 1502. As such, the shafts 1004, 1006, torque bars 1012, 1014, and their corresponding latch mechanisms 1016, 1018 will not turn unless the gear lock 1502 has been unlocked. Furthermore, in some embodiments, a latch lock mechanism 1020 (described in relation to FIG. 20) must also be unlocked before the process to actuate the latch mechanisms 1016, 1018 can begin. In some embodiments, the latch lock mechanism and the gear lock 1502 are independent of one another, and are individually/independently released before the transmission assembly 1000 can be actuated. In some embodiments, the latch lock mechanism 1020 is electrically actuated, and the gear lock 1502 is mechanically activated or vice versa. Activating the two different locks by two separate mechanisms (mechanical and electrical) prevents unauthorized or inadvertent removal of the battery pack 104 from the vehicle 102. Furthermore, in some embodiments, all of the locks are equipped with indicators which indicate possible failure before, during, or after the battery exchange process.

An actuator located on board the vehicle 102 actuates one or both of the above described locks. In some embodiments, the actuator is operated by a single 5V 15 mA digital signal, which is sent from an onboard computer system on the vehicle. In some embodiments, the actuator is protected against excessive power flow by indicators. In some embodiments, other types of mechanical or electro-mechanical actuators may be used to remove the safety locks.

Figure 18:
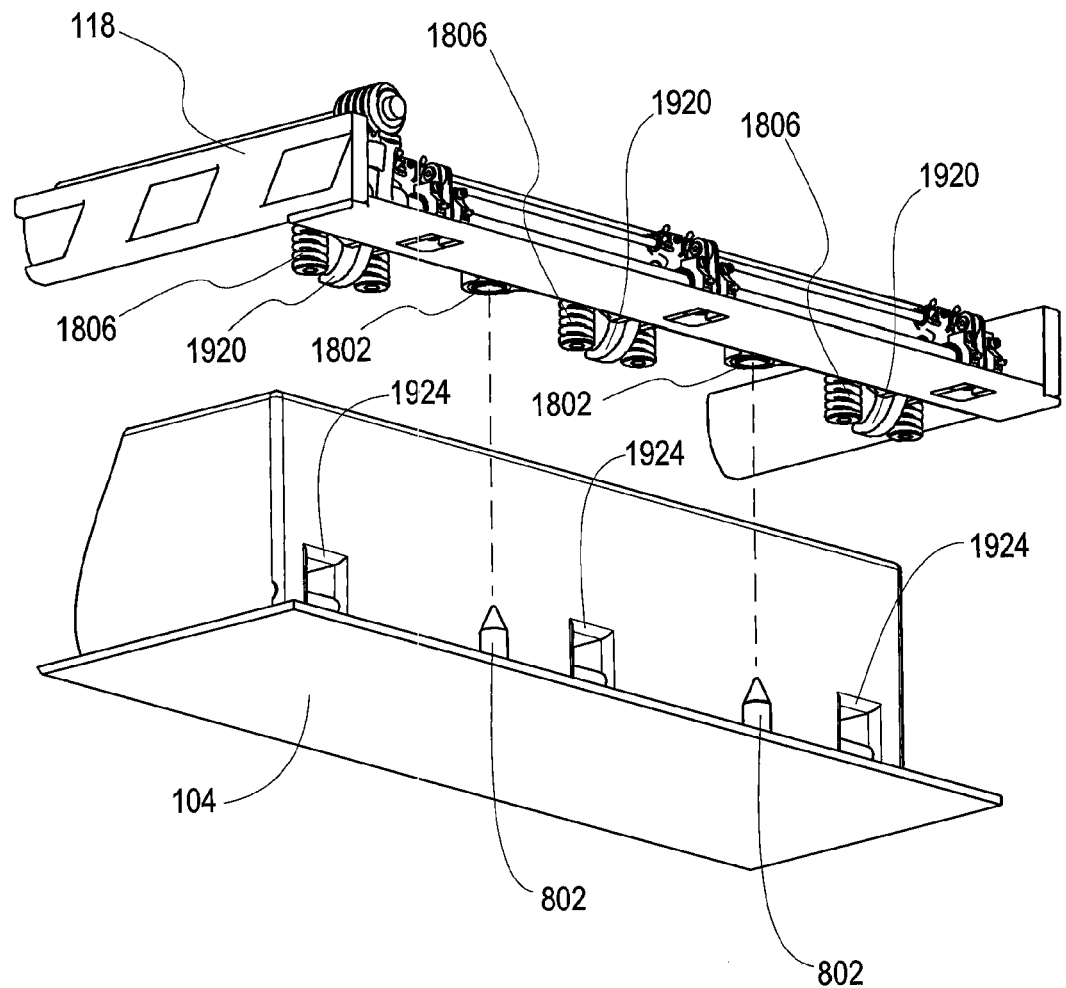
FIG. 18 is a close-up perspective view of an embodiment a battery bay with several alignment sockets configured to mate with alignment pins on the battery pack.

FIG. 18 shows a battery bay 108 with several alignment sockets/holes 1802 configured to receive tapered alignment pins 802 disposed on the battery 104. This figure shows an embodiment with two alignment sockets 1802 and alignment pins 802, but in some embodiments, only one alignment socket 1802 and pin 802 are used. In some embodiments, the aligned pins 802 and the alignment holes have keyed shapes different from one another to prevent backwards or incorrect alignment of the battery pack 104 with the battery bay 108. In some embodiments, at least one compression spring 1806 is mounted to the battery bay 108. The compression springs 1806 are configured to generate a force between the frame 118 battery bay 108 and the battery pack 104 when the battery pack 104 is held and locked at least partially within the cavity 302 of the battery bay 108. Thus, the springs 1806 absorb vertical motion (Y-axis motion) of the battery pack 104 and bay 108 during driving or other operations. Also, the compression springs 1806 help maintain the latches 1920 in contact with the strikers 1924 on the battery locked position, and also help expel the battery 104 from the battery bay 108 when the locks are unlocked. FIG. 18 shows compression springs 1806 on either side of each latch 1920. Matching compression springs 1806 on either side of the latches balance each other such that the resulting force on the battery is substantially in a vertical (Y-axis) direction only. Other embodiments use greater or fewer compression springs 1806. In some embodiments, other types of flexible mechanical parts are used to preload the latches. For example, rubber seals are used instead of the springs 1806.

FIG. 18 shows an embodiment having three strikers 1924. The strikers in FIG. 18 are not bar shaped, as they are shown in other figures, but instead are rounded cut away portions in the frame 118 of the battery pack 104 itself. Other embodiments employ non-bar shaped strikers as well. In some embodiments, the strikers have different forms. In some embodiments, the strikers contain low friction solutions. Examples of low friction solutions include but are not limited to roller bearings or low friction coatings, as shown in FIG. 19A, element 1930.

Figure 19A:
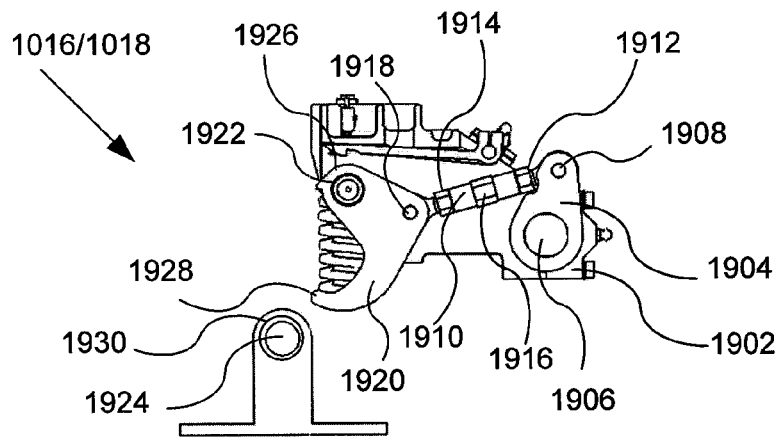
FIGS. 19A-19C are side views of a latch mechanism at various positions.

FIG. 19A shows one embodiment of a latch mechanism 1016, 1018 used by the battery bay transmission assembly 1000. In this embodiment, the latch mechanism 1016, 1018 is a four bar linkage mechanism. The latch mechanism 1016, 1018 comprises a latch housing 1902 which is rigidly attached to the frame of the battery bay. It also comprises a cam shaped input link 1904 rigidly coupled to a respective torque bar at first a pivot point 1906 such that the input link 1904 rotates/pivots together with a torque bar 1012, 1014 around the first pivot point 1906 with respect to the stationary latch housing 1902. The end of the input link 1904 remote from the torque bar is rotatably coupled at second pivot point 1908 to a first rod end 1912 of a coupler link rod 1910. The coupler link rod 1910 has a second rod end 1914 remote from the first rod end 1912 that is pivotably coupled to a latch 1920 at a third pivot point 1918. In some embodiments, the coupler link rod 1910 is a turnbuckle which includes an adjustment bolt 1916 configured to adjust the length of the coupler link rod 1910. The latch 1920 has a fourth pivot point 1922 pivotably connected to another portion of the latch housing 1902. The latch 1920 pivots about an axis, running through the center of the fourth pivot point 1922. In some embodiments, the axis about which the latch pivots at the fourth pivot point 1922 is parallel but distinct from to the axis about which the torque bar 1012, 1014 rotates at the first pivot point 1906. The latch is substantially "V" or hook shaped with the third pivot point 1918 at the apex of the "V." The fourth pivot point 1922 is at an end of the "V" remote from the apex (this end shall be called herein the latch's proximate end 1926). The other end of the "V," is also remote from the apex of the "V" (this other end shall be called the latch's distal end 1928). The distal end 1928 of the latch is configured to engage the bar shaped striker 1924 on the battery pack 104. In some embodiments, the distal end 1928 of the latch 1920 has a hook shape, as shown in FIG. 19A, which is configured to cradle the striker 1924 when engaged with the striker (as shown in FIG. 19C). The hook shaped distal end 1928 is also useful in engaging and lifting the battery pack 104, at least partially, into the cavity of the battery bay 108 (FIG. 3) when engaging/receiving the battery. The striker 1924 may have a low friction element such as a roller bearings or low friction coating 1930.

As shown in FIG. 19A, when the input link 1904 is in a released position, the latch 1920 is configured to mechanically disengage from a corresponding striker 1924 on the battery pack 104. In other words, when the input link 1904 is in a released position, the latch 1920 does not contact the striker 1924. The input link 1904 is driven/rotated, by means of the torque bar 1012, 1014 connected to it.

Figure 19B:
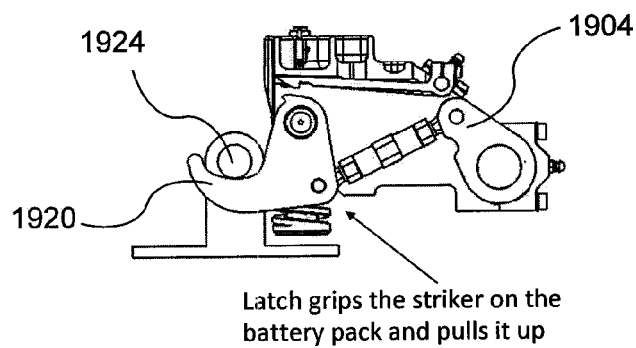
Figure 19C:
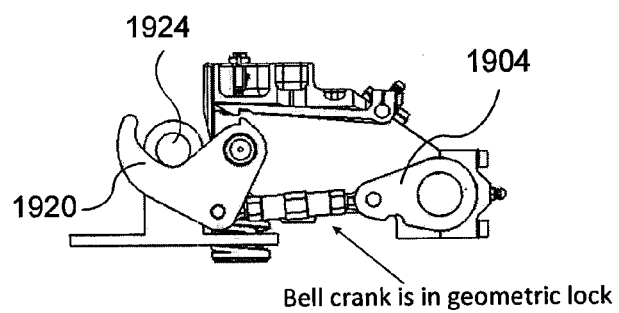

FIG. 19B shows an intermediate position where the input link 1904 has rotated such that the latch 1920 begins to engage the striker 1924 on the battery pack 104 and begins lifting the battery pack 104, at least slightly into the cavity of the battery bay 108 (FIG. 3).

As shown in FIG. 19C, when the input link 1904 is in a fully engaged position, striker 1924 is cradled in the hook shaped distal end 1928 of the latch 1920, and the input link 1904 and coupler link rod 1910 are in a geometric lock configuration. The geometric lock is the position in which the input link 1904 and the coupler link rod 1910 are in vertical alignment with one another with the coupler link rod 1901 in its fully extended position. In other words, the input link 1904, coupler link rod 1901, and first 1906, second 1908, and third 1918 pivot points are all substantially along the same axis. As such, any movement of the battery pack 104 is converted into compression or tensile forces along the single axis to the stationary latch housing 1902 without rotating any of the pivot points. Because the input link 1904 and coupler link rod 1910 are in a geometric lock they prevent the battery 104 from being released from the battery bay 108, such as while the vehicle 102 is driving. Furthermore, in the geometric lock position, only minimal loads are transferred from the battery pack 104 to the drive components of the vehicle 102.

In some embodiments, (a) releasing and (b) engaging are done as follows. The (a) releasing a battery pack 104 from the battery bay 108 is performed by means of the transmission assembly 1000 by rotating the latch(s) 1920 on the battery bay 108 to disengage the striker(s) 1924 on the battery pack 104, and (b) engaging a new battery pack 104 in the battery bay 108 is done by means of the transmission assembly 1000 rotating the latch(s) 1920 on the battery bay 108 to engage, lift, and lock the striker(s) 1924 on the battery pack 104. In some embodiments, the (a) releasing occurs in less than one minute. In some embodiments, the (b) engaging happened in less than one minute. In some embodiments, both the (a) releasing of the first battery pack 104 from the battery bay 108 and the (b) engaging of a second battery pack 104 in the battery bay 108 occur in less than one minute.

In some embodiments, a latch position indicator is utilized to measure whether the latch 1920 is in an engaged or disengaged position. In some embodiments, the latch position indicator communicates the position of the latch 1920 to a computer system in the electric vehicle 102. In some embodiments, other indicators are used throughout the battery pack 104 and battery bay 108 to verify the workings of any or all of the following elements: the first gear lock 1502, the latch lock mechanism 1020, the latch mechanism 1016, 1018, the miter gear set 1002, the torque bars 1010, 1012, the gear shafts 1004, 1006, the electrical connector 804, and the position of the battery pack 104 inside the battery bay 108. In some embodiments, the indicators include switches, Hall sensors, and/or micro-switches. In some embodiments, the alignment devices (such as alignment pins 802 and latch mechanisms 1016, 1018) and position indicators allow the battery pack 104 to be precisely monitored and positioned inside the battery bay 108 in six different degrees of freedom (3 degrees of translation and 3 degrees of rotation.)

In some embodiments, the battery bay have some or all of the following internal electric indications: a) proper/improper connection of the electrical connectors between the battery bay and the battery pack; b) open/close indication on each of the individual latches which fasten the battery pack to the battery bay; c) open/close indication on each of the safety lock devices; d) existence/non existence of the unique key like device which is mentioned in section 14; e) in-position/out-of-position of battery pack inside the battery bay in at least three different locations around the battery pack; f) excessive/in-excessive temperature measurement in two different locations within the battery bay. (Excessive temperature may be a temperature above 90° C.); and g) excessive/in-excessive power limits in the quick release actuator.

FIG. 20 is a detailed view of the latch lock mechanism 1020. When the latch mechanism 1016, 1018 is in its lock configuration, with the latch 1920 engaging the striker 1924, the latch lock mechanism 1020 will also be engaged. The latch lock mechanism 1020 is configured to prevent the latch mechanism 1016, 1018 from rotating when engaged. In some embodiments, the latch lock mechanism 1020 comprises a toothed cantilevered lock arm (2002) (also called a lock bolt) configured to engage a corresponding tooth 2010 on the latch 1920. As such, the toothed cantilevered lock arm 2002 is configured to prevent the latch 1920 from rotating when engaged. The toothed cantilevered lock arm 2002 is coupled to a lock synchronization bar 2004, which is configured to disengage the toothed cantilevered lock arm 2002 when rotated. The lock synchronization bar 2004 is also coupled to a lock actuator 2006, which is configured to rotate the synchronization bar 2004. In some embodiments, the lock actuator 2006 includes an electric motor 2008 that rotates the lock synchronization bar 2004 via a gear set or any other suitable mechanism. In some embodiments, the electric motor 2008 is activated by an electric lock or unlock signal. In other embodiments, latch lock mechanism is mechanically activated. In some embodiments, both electrical and mechanical activation is provided, the mechanical activation being useful if any electronic malfunctions occur. In some embodiments, the latch lock mechanism 1020 is configured to disengage only after the gear lock 1502 (shown in FIG. 15) has been released.

The lock synchronization bar 2004 is configured to rotate one or more latch locks 2002 in a first direction so that the one or more latch locks 1920 engage with the latch 1920. The lock synchronization bar 2004 is also configured to rotate the one or more latch locks 2002 in a second, opposite, direction to disengage the latch locks 2002 from the latch 1920. As such, after the latch locks have been rotated in a second direction, to unlock the latch 1920, the latch is allowed to disengage the striker 1924 by means of the torque bar 1012, 1014 rotation through the four bar linkage latch mechanism 1016, 1018 described above.

By means of the mechanisms described above, the miter gear set 1002, driven by the electric drive motor 1310, causes the latches 1016, 1018 to rotate opposite one another. When the latches 1016, 1018 on either side of the battery bay 108 rotate away from each other, they release the corresponding strikers 1924 on the battery 104.

Figure 21:
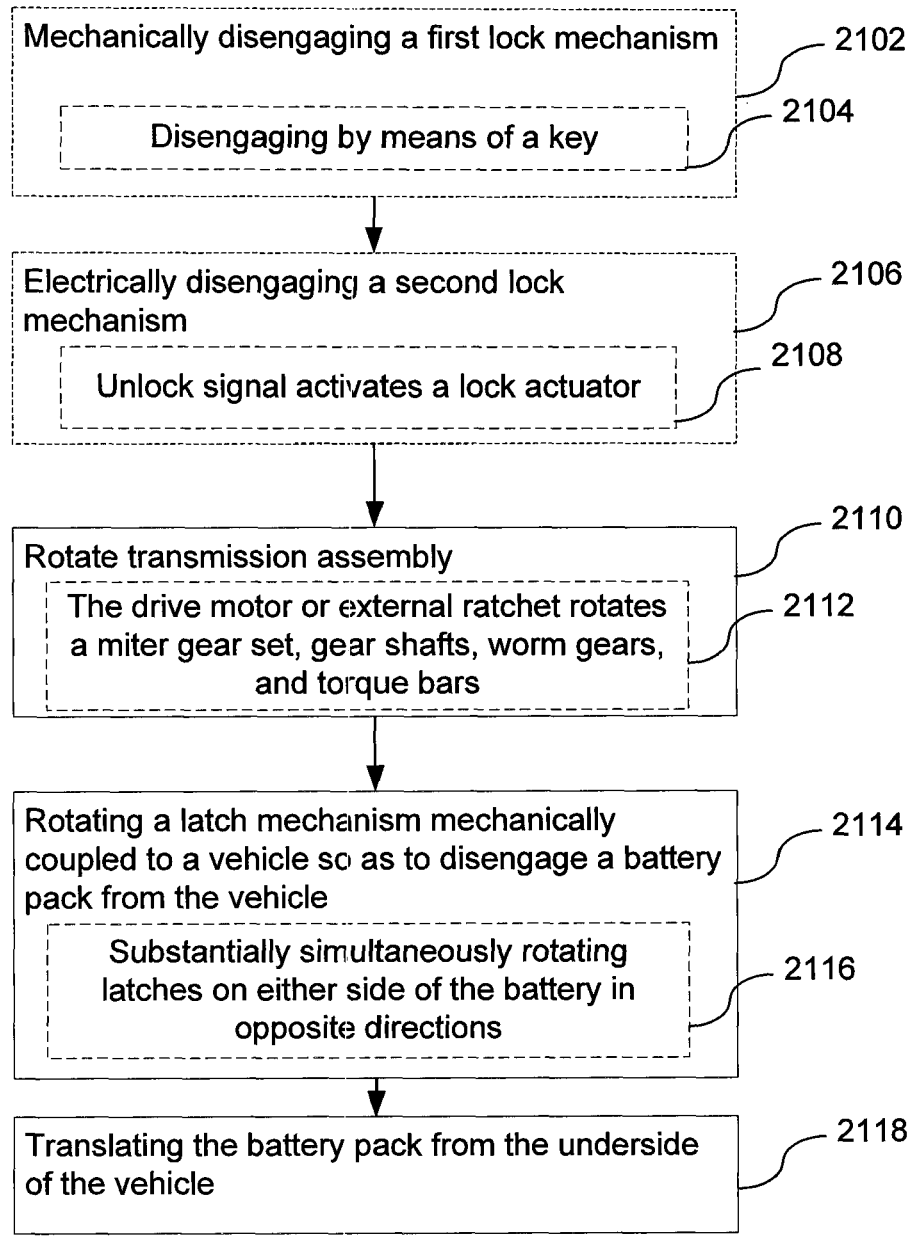
FIG. 21 is a flow diagram of a process for releasing a battery pack from a battery bay.

FIG. 21 is a flow diagram of a process for releasing a battery pack from a battery bay. In some embodiments, the release process happens as follows. A first latch mechanism, the miter gear lock 1502, is which physically released (2102). In some embodiments, the physical release happens by means of a key 1602 inserted into the key hole 1402 (2104). A second latch mechanism, the latch lock mechanism 1020, releases the one or more latches 1016, 1018 (2106). In some embodiments, the latch lock unlocks when an electric motor 2008, activated by an electronic unlock signal, actuates the lock actuator 2006 which rotates the latch lock 2002 and disengage its tooth from the tooth of the latch 1920 by rotating the lock synchronization bar 2004 (2108). Once both the miter gear lock and the latch lock have been released, the battery 104 is released from the battery bay 108 as follows. The drive motor 1310 actuates a transmission assembly (2110). In some embodiments, the transmission assembly is actuated as follows, the drive motor 1310 rotates the miter gear set, which rotates the gear shafts, which rotate the worm gears, which rotate the torque bars (2112). Specifically, the drive motor rotates the central gear 1302 of the miter gear set 1002 by means of a gear ratio set 1312. As the central gear 1302 rotates it drives the first outer gear 1304 in a first rotational direction and the second outer gear 1306 in a second rotational direction opposite of the first rotational direction. The first outer gear 1304 drives the first gear shaft 1004 in a first rotational direction, while the second outer gear 1306 drives the second gear shaft 1006 in a second rotational direction. The first gear shaft 1004 rotates the first torque bar 1012 by means of the first worm gear set 1008. The second gear shaft 1006 rotates the second torque bar 1014 in a direction opposite that of the first torque bar 1012 by means of the second worm gear set 1010. The rotation of the first torque bar 1012 then causes at least one latch 1920 to rotate and disengage a striker 1924 on the battery 104 (2114). Specifically, the first torque bar 1012, being coupled to the input link 1904, rotates the input link 1904, which actuates the coupler link rod 1910 such that the latch 1920 disengages the striker 1924. In some embodiments, substantially simultaneously, the rotation of the second torque bar 1014 causes the latch mechanism 1018 coupled to the second torque bar 1014 to rotate in a direction opposite that of the latch mechanism 1016 coupled to the first torque bar 1012. As such, latches on either side of the battery bay 108 rotate away from one another to release their respective strikers 1924. (2116) Then the battery pack is translated vertically downward away from the underside of the vehicle. In some embodiments, the battery pack is translated by means of first being lowered onto a platform under the battery and then being further lowered by means of the platform lowering.

Figure 22:
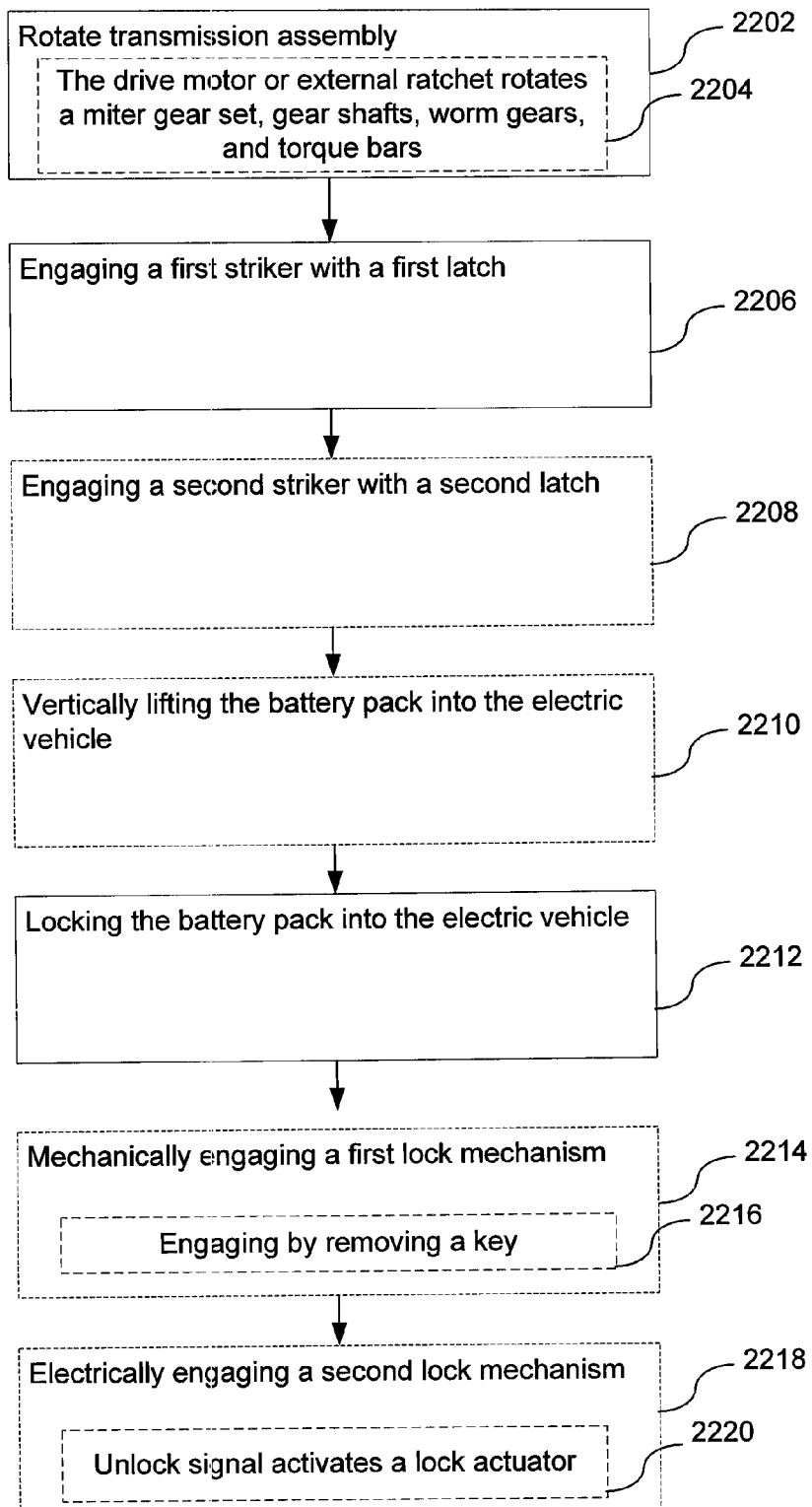
FIG. 22 is a flow diagram of a process for engaging a battery pack to a battery bay.

FIG. 22 is a flow diagram of a process for engaging a battery pack to a battery bay. To engage a battery 104 at least partially within the battery bay 108 involves substantially the same process described above only in reverse. Specifically, the drive motor 1310 actuates a transmission assembly (2202). In some embodiments, the transmission assembly is actuated as follows, the drive motor 1310 rotates the miter gear set, which rotates the gear shafts, which rotate the worm gears, which rotate the torque bars (2204). Specifically, the drive motor 1310 rotates the central gear 1302 of the miter gear set 1002 in the opposite direction as that used for disengaging a battery 104 by means of a gear ratio set 1312. As the central gear 1302 rotates, it drives the first outer gear 1304 one rotational direction and the second outer gear 1306 in the opposite direction. The first outer gear 1304 drives the first gear shaft 1004 in one direction, while the second outer gear 1306 drives the second gear shaft 1006 in the opposite direction. The first gear shaft 1004 rotates the first torque bar 1012 by means of the first worm gear set 1008. The second gear shaft 1006 rotates the second torque bar 1014 in a direction opposite that of the first torque bar 1012 by means of the second worm gear set 1010. The rotation of the first torque bar 1012 then causes at least one first latch 1920 to rotate and engage a striker 1924 on the battery 104 (2206). Specifically, the first torque bar 1012, being coupled to the input link 1904, rotates the input link 1904, which actuates the coupler link rod 1910 such that the latch 1920 engages the striker 1924. In some embodiments, the first latch is located at the front end of the underside of the vehicle. In some embodiments, substantially simultaneously a second latch located at the back end of the electronic vehicle is also rotated in the same manner (2208).

Once the strikers are engage, they then vertically lift the battery at least partially into the battery bay of the electronic vehicle (2210). The lifting happens as follows, substantially simultaneously, the rotation of the second torque bar 1014 causes the latch mechanism 1018 coupled to the second torque bar 1014 to rotate in a direction opposite that of the latch mechanism 1016 coupled to the first torque bar 1012. As such, latches on either side of the battery bay 108 rotate towards one another to engage their respective strikers 1924 substantially simultaneously and lift them. Then the battery is secured into the battery bay 108 (2212). Specifically, the latches 1920 hook onto the strikers 1924 and lift the battery until the latches are in their geometric lock (dead center) positions. Once the battery 104 is engaged, the first lock mechanism is engaged. (2214) Specifically, once the four bar mechanism of the latches 1016, 1018 are in their geometric lock positions, the key 1602 is removed from the key hole 1401 and the locking latch 1702 with a locking tooth 1704 engages with the locking gear 1706 (2216). Also, the second lock mechanism is electrically engaged (2218). Specifically, the an electric motor 2008, activated by an electronic unlock signal, actuates the lock actuator 2006 which rotates the latch lock 2002 and engages its tooth with the tooth of the latch 1920 by rotating the lock synchronization bar 2004 (2220).

In some embodiments, the battery bay 108 is configured to be disposed at the underside of the at least partially electric vehicle 102 such that the releasing and engaging mechanisms described can release an at least partially spent battery 104 and have it replaced by an at least partially charged battery 104 underneath the vehicle 102.

As described above, in reference to FIGS. 21 and 22, in some embodiments, the first latch mechanism 1016 and the second latch mechanism 1018 substantially simultaneously rotate in opposite directions about their respective axes. In some embodiments, the at least two latches rotate towards one another to engage, lift, and lock the battery 104 at least partially within the cavity of the battery bay 108. In some embodiments, the at least two latches then rotate away from each other to disengage the battery 104. Similarly, the battery pack 104 is disengaged and unlocked from the at least partially electric vehicle 102 when the latches 1920 of the first latch mechanism 1016 and the second latch mechanism 1018 substantially simultaneously rotate away from one another.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A battery bay configured to be disposed at an underside of an at least partially electric vehicle, the battery bay comprising:
   a frame defining a cavity configured to at least partially receive a battery pack therein from an underside of an at least partially electric vehicle;
   at least three latches each being mounted on the frame for rotation with respect to the frame and being engageable with respective strikers of the battery pack to mechanically couple the battery pack from the underside of the vehicle, wherein said at least three latches are mounted for rotation towards engaged positions such that when engaged with the respective strikers they vertically lift and fasten the battery pack in the battery bay; and
   at least one drive system coupled to the latches, the at least one drive system being configured for substantially simultaneously rotating all of the latches to substantially simultaneously engage with the respective strikers and vertically lift the battery pack from the underside of the vehicle, securing the battery pack at least partially into the cavity such that during Normal and Exceptional Operating Conditions of the electric vehicle, the battery pack does not substantially rock, rattle, or otherwise move.

2. The battery bay of claim 1, wherein the at least one drive system comprises a transmission assembly mechanically coupling the at least three latches.

3. The battery bay of claim 2, wherein the at least one drive system further comprises an electric motor.

4. The battery bay of claim 2, wherein the transmission assembly is configured to be driven by a rotation mechanism external to the vehicle.

5. The battery bay of claim 1, further comprising: at least one compression spring mounted to the frame so as to generate a force between the frame and the battery pack in a direction substantially opposite to the lifting force when the battery pack is at least partially retained within the cavity.

6. The battery bay of claim 1, wherein one or more vibration dampers are disposed between the frame and the at least partially electric vehicle.

7. The battery bay of claim 1, wherein the battery bay further comprises: a latch position indicator configured to determine whether one of the latches is in an engaged position.

8. The battery bay of claim 1, further including, for at least one of the latches: a latch housing; a first rotational member including a first pivot point and a second pivot point, wherein the first pivot point is permanently attached to a torque bar which rotates with respect to a first portion of the latch housing; a coupler link rod including a first rod end and a second rod end, wherein the first rod end is pivotably coupled to the second pivot point of the first rotational member; and the at least one latch including a third pivot point and a fourth pivot point, wherein the third pivot point is pivotably coupled to the second rod end of the coupler link rod and the fourth pivot point is pivotably coupled to a second portion of the latch housing.

9. The battery bay of claim 8, wherein a length of the coupler link rod is adjustable.

10. The battery bay of claim 9, wherein the geometric lock exists when the rotational member, coupler link rod, and the first, second, and third pivot points are all substantially along the same axis.

11. The battery bay of claim 8, wherein when the latch is in a locked position engaged with the respective striker of the battery pack, the rotational member, coupler link rod, and latch form a geometric lock.

12. The battery bay of claim 8, wherein the rotational member is a cam shaped input link.

13. The battery bay of claim 1, further comprising: a mechanical lock which is configured to prevent at least one of the latches from rotating when engaged.

14. The battery bay of claim 13, wherein the mechanical lock is configured to be released with a key inserted along an axis substantially perpendicular to the plane formed by the underside of the vehicle.

15. The battery bay of claim 1, further comprising: at least one electrically activated latch lock which is configured to prevent the latch from rotating when engaged.

16. The battery bay of claim 1, wherein said at least three latches comprise two latches rotatable in opposite directions towards the engagement positions with the respective strikers, and when engaged vertically lift the battery pack until the latches are in a geometric lock position thereof at which any movement of the battery pack is converted into compression or tensile forces on said pivot points without rotating any of said pivot points, thereby preventing the battery pack from being released from the battery bay.

17. A battery system for an electric vehicle, comprising:
a battery bay, for receiving a battery pack, located on an underside of the electric vehicle, said battery bay comprising:
  a first latch at the underside of the electric vehicle, the first latch comprising a first hook configured to mechanically engage a first striker at a first end of the battery pack; and
  a second latch at the underside of the electric vehicle, the second latch comprising a second hook configured to mechanically engage a second striker at a second end of the battery pack,
  wherein the first latch and the second latch are configured for rotation in opposite directions to thereby engage with the respective strikers, and when engaged vertically lift the battery pack until the latches are in a geometric lock position at which any movement of the battery pack being held by the first and second latches is converted into compression or tensile forces on pivot points of the battery bay without rotating any of said pivot points, thereby locking the first and second strikers of the battery pack to the electric vehicle substantially simultaneously, and secure the battery pack at least partially into the battery bay such that during Normal and Exceptional Operating Conditions of the electric vehicle, the battery pack does not substantially rock, rattle, or otherwise move.

18. The battery bay of claim 17, wherein each of the first and second latches comprises:
  a hook configured to engage the respective striker coupled with the battery pack, the latch being configured to retain the battery pack at least partially within a cavity of the battery bay;
  a first rotational member including a first pivot point and a second pivot point, wherein the first rotational member is configured to rotate about the first pivot point;
  a coupler link rod including a first rod end and a second rod end, wherein the first rod end is pivotably coupled to the second pivot point of the first rotational member, and
  a third pivot point and a fourth pivot point, the third pivot point is pivotably coupled to the second rod end of the coupler link rod, and the latch is configured to rotate about the fourth pivot point.

19. The battery bay of claim 18, further comprising: a worm gear coupled with the rotational member.

20. The battery bay of claim 19, further comprising: a partial gear coupled with the worm gear.

21. The battery bay of claim 19, further comprising: a motor coupled with the worm gear and configured to rotate the worm gear.

22. The battery bay of claim 21, wherein the first rotational member is configured to be rotated by the worm gear.

* * * * *